(12) United States Patent
Shikama et al.

(10) Patent No.: US 11,046,091 B2
(45) Date of Patent: Jun. 29, 2021

(54) DATA GENERATION SYSTEM, COMMUNICATION TERMINAL, IMAGE FORMING APPARATUS, DATA GENERATION METHOD, AND NON-TRANSITORY, COMPUTER-READABLE STORAGE MEDIUM

(71) Applicants: Takeshi Shikama, Kanagawa (JP);
Yasunari Harada, Kanagawa (JP);
Hiroki Tanaka, Kanagawa (JP)

(72) Inventors: Takeshi Shikama, Kanagawa (JP);
Yasunari Harada, Kanagawa (JP);
Hiroki Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 89 days.

(21) Appl. No.: 16/508,949

(22) Filed: Jul. 11, 2019

(65) Prior Publication Data

US 2020/0079111 A1    Mar. 12, 2020

(30) Foreign Application Priority Data

Sep. 7, 2018   (JP) .............................. JP2018-168018

(51) Int. Cl.
| | |
|---|---|
| *B41J 3/36* | (2006.01) |
| *H04N 1/00* | (2006.01) |
| *B41J 2/47* | (2006.01) |
| *B41J 2/45* | (2006.01) |

(52) U.S. Cl.
CPC . *B41J 3/36* (2013.01); *B41J 2/45* (2013.01); *B41J 2/47* (2013.01); *H04N 1/00809* (2013.01); *H04N 1/00816* (2013.01); *H04N 1/00827* (2013.01)

(58) Field of Classification Search
CPC ....... B41J 3/36; B41J 2/47; B41J 2/45; H04N 1/00827; H04N 1/00816; H04N 1/00809
USPC ..................................... 347/5, 109, 129, 130
See application file for complete search history.

(56) References Cited

U.S. PATENT DOCUMENTS

| | | | | |
|---|---|---|---|---|
| 10,479,105 | B2 * | 11/2019 | Hosokawa | ............. B41J 2/2135 |
| 2007/0146819 | A1 * | 6/2007 | Kai | .................... H04N 1/00737 |
| | | | | 358/474 |
| 2012/0057889 | A1 * | 3/2012 | Yamaguchi | ........ G03G 15/5058 |
| | | | | 399/51 |

(Continued)

FOREIGN PATENT DOCUMENTS

| | | |
|---|---|---|
| JP | 2016-112700 | 6/2016 |
| JP | 2016-215472 | 12/2016 |

(Continued)

*Primary Examiner* — An H Do
(74) *Attorney, Agent, or Firm* — Oblon, McClelland, Maier & Neustadt, L.L.P.

(57) ABSTRACT

A data generation system includes circuitry configured to generate data of sub-images constructing an image. Each of the sub-images includes at least one of image elements of the image. The image elements are aligned in a direction perpendicular to a given direction in which an image forming apparatus moves to form the image. The circuitry is configured to, when, in an attempt to add another one of the image elements adjacent to the at least one of the image elements in one of the sub-images, the other one of the image elements does not fit within the one of the sub-images, generate data of the one of the sub-images without the other one of the image elements.

14 Claims, 18 Drawing Sheets

(56) References Cited

U.S. PATENT DOCUMENTS

| | | |
|---|---|---|
| 2012/0062682 A1 | 3/2012 | Komai et al. |
| 2013/0063536 A1 | 3/2013 | Komai et al. |
| 2016/0339720 A1 | 11/2016 | Tanaka |
| 2017/0134598 A1 | 5/2017 | Nagano et al. |
| 2017/0142271 A1 | 5/2017 | Kawai et al. |

FOREIGN PATENT DOCUMENTS

| | | |
|---|---|---|
| JP | 2017-090908 | 5/2017 |
| JP | 2017-098951 | 6/2017 |

\* cited by examiner

FIG. 1
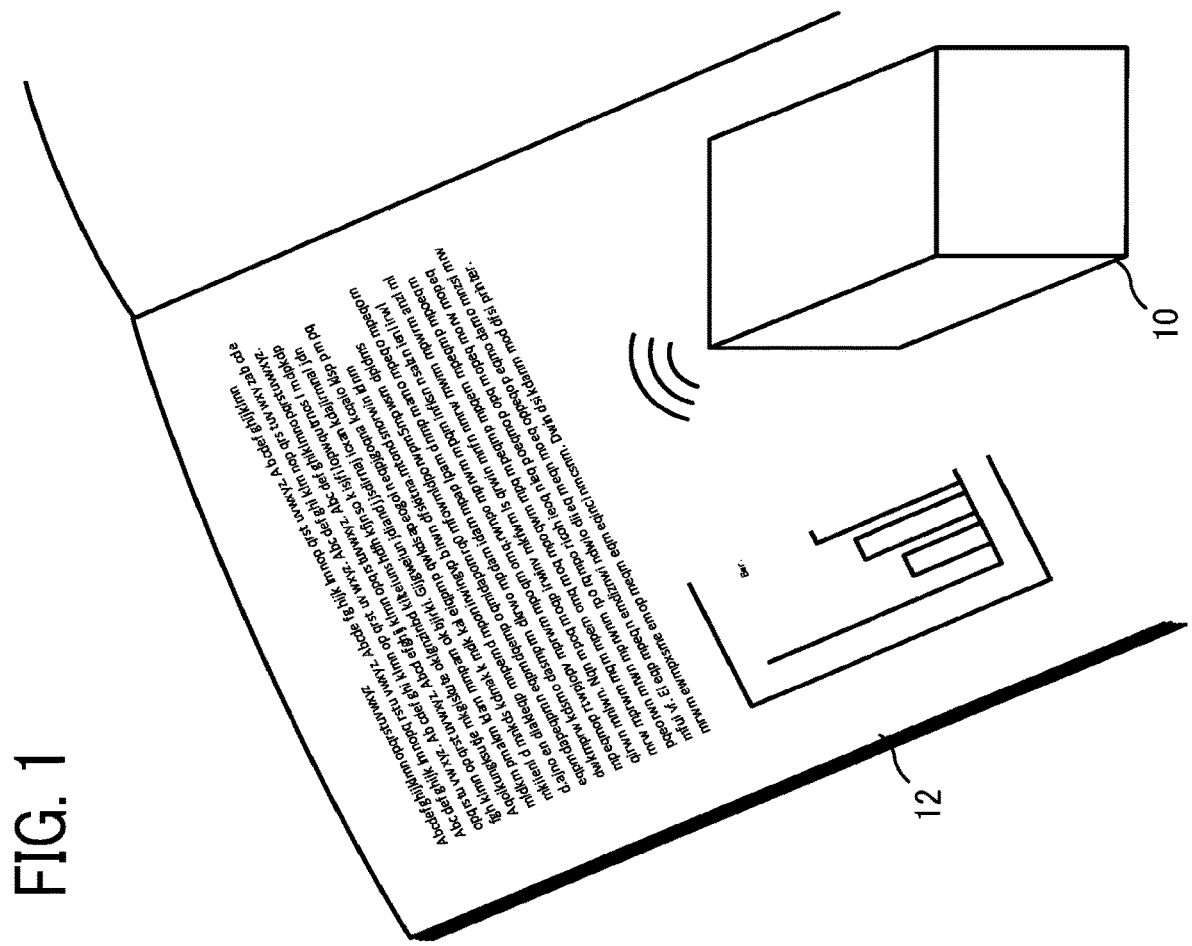
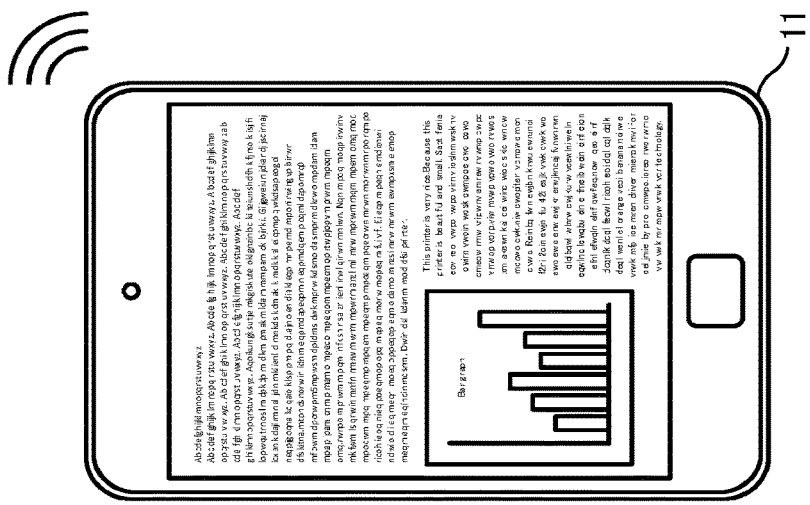

DATA GENERATION SYSTEM, COMMUNICATION TERMINAL, IMAGE FORMING APPARATUS, DATA GENERATION METHOD, AND NON-TRANSITORY, COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2018-168018, filed on Sep. 7, 2018, in the Japan Patent Office, the entire disclosure of which is hereby incorporated by reference herein.

BACKGROUND

Technical Field

Embodiments of the present disclosure generally relate to a data generation system, a communication terminal, an image forming apparatus, a data generation method, and a non-transitory computer-readable storage medium. In particular, the embodiments of the present disclosure relate to a system for generation data used in an image forming apparatus that is repeatedly moved in a given direction on a medium to form an image, a communication terminal including the data generation system, an image forming apparatus including the data generation system, a method for generation the data, and a non-transitory computer-readable storage medium storing computer-readable program code that causes a computer to perform the method.

Related Art

There is known a handheld printer that applies ink while being manually operated to freely scan on a paper surface (i.e., freehand scanning), without a paper conveyance system. The handheld printer receives image data from a communication terminal, such as a smart device or a computer, and discharges droplets from nozzles of a recording head to form an image. The image that can be formed by one scan depends on a length of the nozzles in a longitudinal direction thereof. An image larger than the length is divided into sub-images so that the image is formed by a plurality of scans.

SUMMARY

In one embodiment of the present disclosure, a novel data generation system includes circuitry configured to generate data of sub-images constructing an image. Each of the sub-images includes at least one of image elements of the image. The image elements are aligned in a direction perpendicular to a given direction in which an image forming apparatus moves to form the image. The circuitry is configured to, when, in an attempt to add another one of the image elements adjacent to the at least one of the image elements in one of the sub-images, the other one of the image elements does not fit within the one of the sub-images, generate data of the one of the sub-images without the other one of the image elements.

Also described are novel communication terminal and image forming apparatus incorporating the data generation system, data generation method, and non-transitory, computer-readable storage medium storing computer-readable program code that causes a computer to perform the image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1 is a diagram illustrating a configuration of an image forming system including a handheld printer and a smart device according to an embodiment of the present disclosure;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 2:
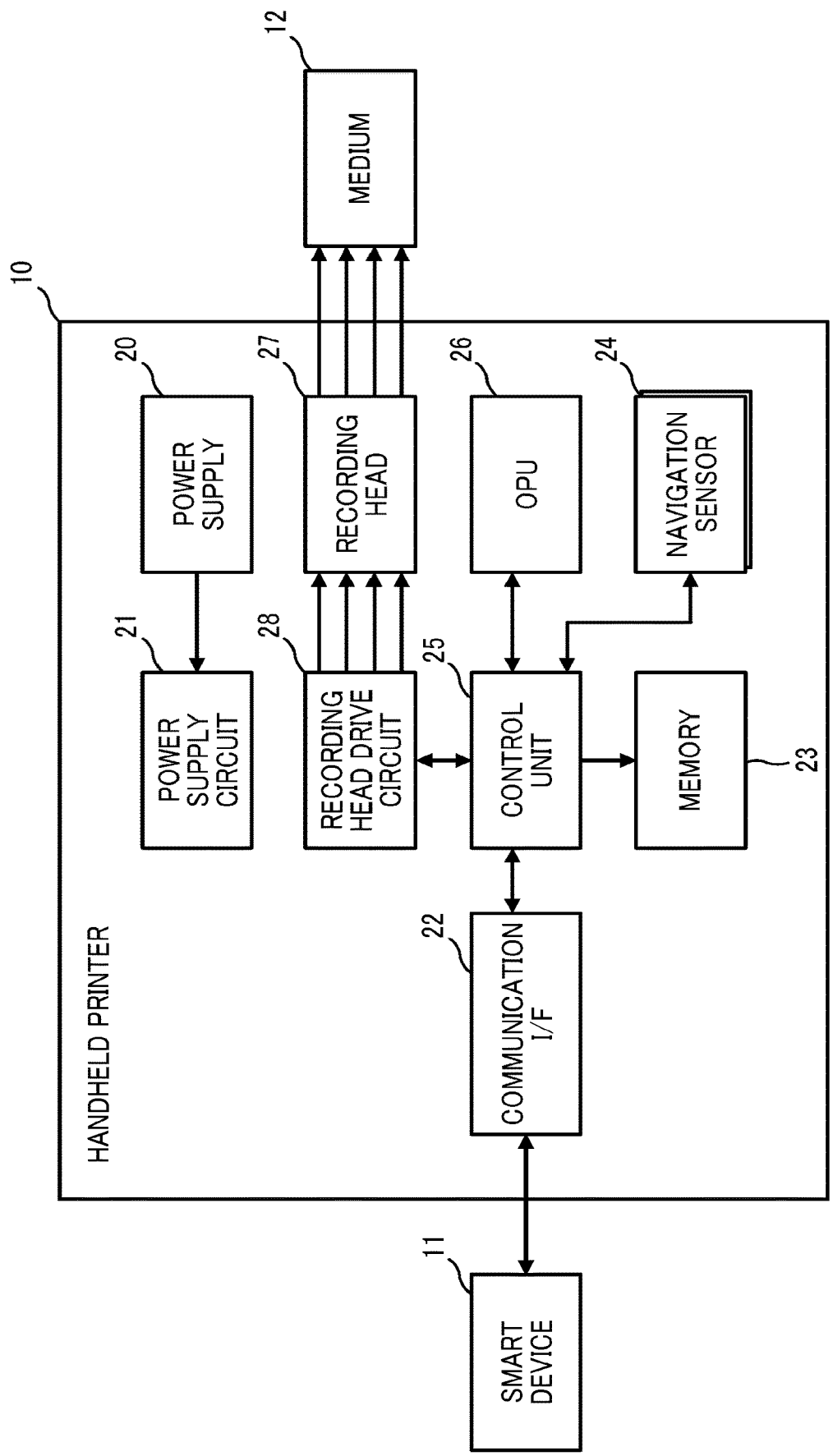
FIG. 2 is a block diagram illustrating a hardware configuration of the handheld printer.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

Initially with reference to FIG. 1, a description is given of an image forming system including a handheld printer 10 serving as an image forming apparatus and a smart device 11 serving as a communication terminal.

FIG. 1 is a diagram illustrating a configuration of the image forming system including the handheld printer 10 and the smart device 11 according to an embodiment of the present disclosure.

The image forming apparatus is not limited to a handheld printer provided that the image forming apparatus is manually operated to form an image. The image forming system may include a network and another device, such as a server device.

The handheld printer 10 has a size and a weight allowing, e.g., a user to carry the handheld printer 10 by one hand and freely move the handheld printer 10 on a printable medium 12, such as a notebook or standard paper, to print on the medium 12.

The handheld printer 10 may be, but is not limited to, an inkjet printer that discharges droplets of, e.g., ink from a nozzle to print on the medium 12. Alternatively, the handheld printer 10 may be a dot-impact printer that hits a thin pin against an ink ribbon for printing. The handheld printer 10 may be a monochrome printer or a color printer.

The handheld printer 10 receives, as image data, an image to be printed. According to the image data, the handheld printer 10 discharges, e.g., ink on the medium 12, thereby printing the image on the medium 12. The image to be printed may include text alone or may include figures, pictures, photographs, and the like. The handheld printer 10 receives print setting information, together with the image data, to form the image according to the print setting information. An example of the print setting information is monochrome/color printing designated.

Through wireless communication such as infrared communication, Bluetooth (registered trademark), or Wi-Fi, the handheld printer 10 receives image data from the smart device 11 that holds the image data. The handheld printer 10 may receive the image data from the smart device 11 directly or indirectly via an access point or the like. Alternatively, the handheld printer 10 may be connected to the smart device 11 via, e.g., a cable to receive the image data through wired communication, instead of the wireless communication.

The smart device 11 is, e.g., a smart phone, a tablet terminal, or a notebook computer. The smart device 11 performs the wireless communication with the handheld printer 10 to transmit the image data, which the smart device 11 holds, to the handheld printer 10. The smart device 11 may also receive image data from, e.g., a server device, and transfer the image data thus acquired to the handheld printer 10.

A user, for example, turns on the smart device 11 and activates an application installed in the smart device 11 to display an image. When desiring to print the image, the user taps a print start button displayed on a touch panel, for example, thereby instructing the smart device 11 to print the image. In response to the print instruction, the smart device 11 transmits data of the image (i.e., image data) to the handheld printer 10 through the wireless communication.

The handheld printer 10 receives the image data to be printed from the smart device 11. The user holds the handheld printer 10 and freely moves the handheld printer 10 on the medium 12. Meanwhile, the handheld printer 10 calculates a position of each nozzle. In practice, the handheld printer 10 calculates the position of each nozzle as a coordinate position relative to a home or initial position initially determined as a reference.

When the coordinate positions of the nozzles thus calculated are within a tolerance from coordinate positions of image elements constructing the image of the image data received, the handheld printer 10 transmits print data for printing the image elements to a control unit 25 that controls a recording head 27. Specifically, the control unit 25 causes the recording head 27 having a plurality of nozzles to discharge ink from the nozzles at the coordinate positions for printing. The handheld printer 10 repeats such an action to print the image on the medium 12.

As illustrated in FIG. 1, the handheld printer 10 is a box-shaped printer having a plurality of nozzles to discharge ink. When using the handheld printer 10, the user presses a surface having the plurality of nozzles of the handheld printer 10 against the medium 12, which is a flat medium. The plurality of nozzles is arranged such that tips thereof are apart from the surface of the medium 12 when the user presses the handheld printer 10 against the medium 12. Note that the distance from the tips of the nozzles to the medium 12 is predetermined as a distance that allows the nozzles to discharge ink to print images as appropriate. The user presses the surface having the plurality of nozzles of the handheld printer 10 against the medium 12 while repeatedly moving the handheld printer 10 left to right on the medium 12, thereby printing the image on the medium 12.

Referring now to FIG. 2, a description is given of a hardware configuration of the handheld printer 10.

FIG. 2 is a block diagram illustrating the hardware configuration of the handheld printer 10.

The handheld printer 10 includes a power supply 20 such as a cell or a battery that supplies power to be used in the handheld printer 10. The handheld printer 10 further includes a power supply circuit 21 that converts the power into power to be used by units such as the control unit 25 and a recording head drive circuit 28. The power supply circuit 21 switches between a charging circuit of the battery and an alternating current (AC) power supply, for example. The handheld printer 10 further includes a communication interface (I/F) 22 that receives image data transmitted from the smart device 11.

The handheld printer 10 further includes a memory 23, two or more navigation sensors 24, the control unit 25, an operation unit (OPU) 26, the recording head 27, and the recording head drive circuit 28. Hereinafter, the two or more navigation sensors 24 may be collectively referred to as a navigation sensor 24. The memory 23 stores, e.g., firmware for controlling the hardware of the handheld printer 10, drive waveform data for driving the recording head 27, and initial setting data for performing initial setting of the handheld printer 10. The memory 23 temporarily stores image data received by the communication I/F 22. In addition, the memory 23 is used as a work area when the firmware operates.

The two or more navigation sensors 24 are used to calculate positional information of the handheld printer 10 and positional information of the recording head 27. The positional information is coordinate information in a two-dimensional plane. The positional information of the initial position is, e.g., coordinates (0, 0). The two or more navigation sensors 24 calculate and output a moving distance (or moving amount) in a horizontal direction (i.e., X-axis direction) and a vertical direction (i.e., Y-axis direction) specified based on the initial position.

The X-axis direction and the Y-axis direction are the horizontal direction and the vertical direction, respectively, from the position of the navigation sensor 24 detecting the initial position. When the navigation sensor 24 is provided in front and back of the plurality of nozzles arranged, the Y-axis direction is the vertical direction in which the navigation sensor 24 and the plurality of nozzles are arranged; whereas the X-axis direction is the horizontal direction perpendicular to the vertical direction (i.e., Y-axis direction). Note that the navigation sensor 24 may detect, e.g., the rotational amount and acceleration of the recording head 27, in addition to the moving amount, to obtain accurate position coordinates. The rotational amount is, e.g., an angle at which the recording head 27 is inclined in a longitudinal direction thereof with respect to the Y axis. Alternatively, the rotational amount may be an angle with respect to the X axis.

Figure 3:
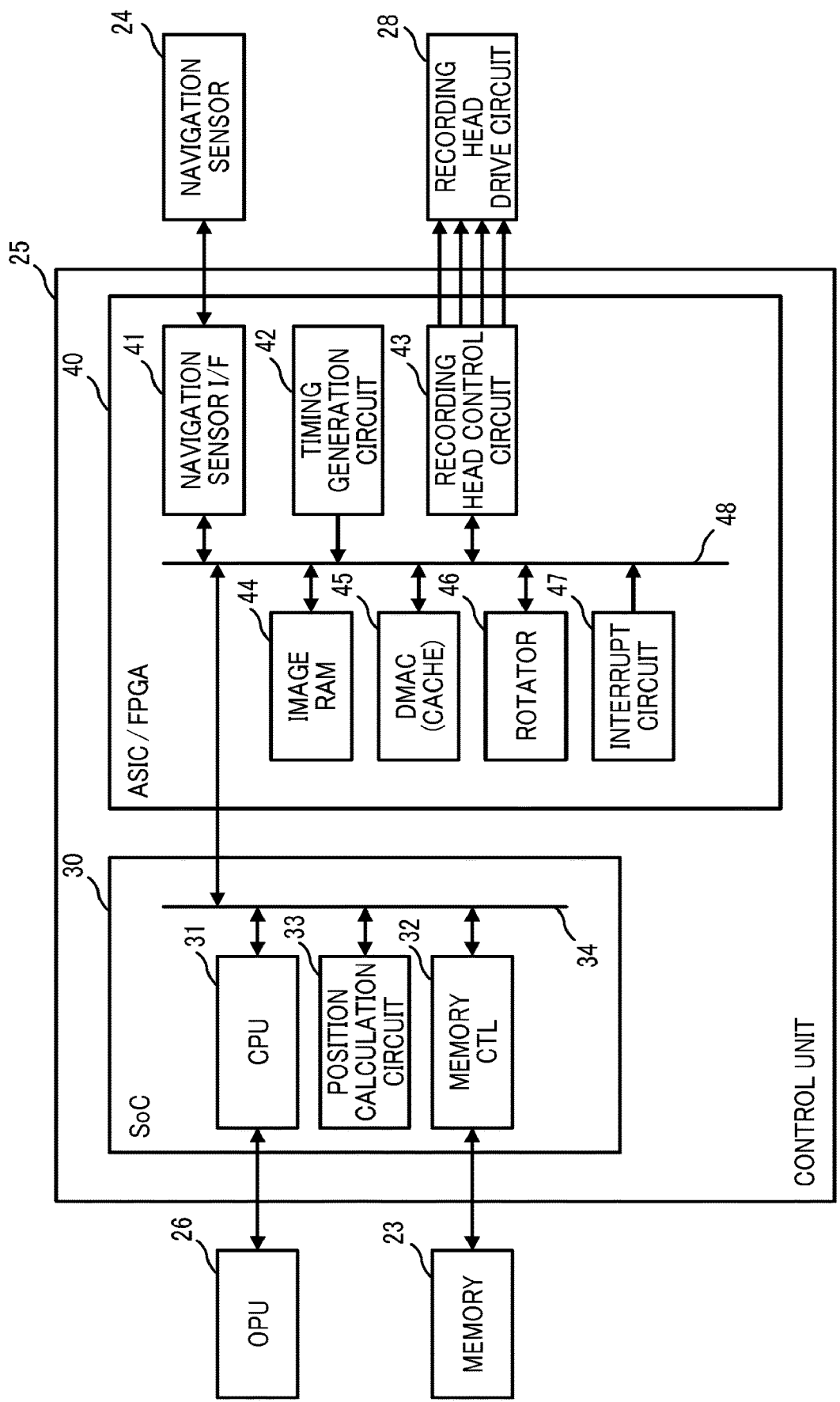
FIG. 3 is a block diagram illustrating a configuration of a control unit included in the handheld printer of FIG. 2.

The control unit 25 includes a system on chip (SoC) 30 and an application specific integrated circuit/field-programmable gate array (ASIC/FPGA) 40, as illustrated in FIG. 3. A detailed description of the control unit 25 is deferred. The control unit 25 generally controls the handheld printer 10. For example, based on the information from the navigation sensor 24, the control unit 25 calculates position coordinates of each nozzle of the recording head 27, selects an image element corresponding to the position coordinates of each nozzle of the recording head 27, and determines whether to print.

The OPU 26 is constructed of, e.g., a light emitting diode (LED) and a switch. The LED displays the status of the handheld printer 10. The user gives a print instruction with the switch. The LED and the switch are examples of components of the OPU 26. The OPU 26 may include operation keys, a liquid crystal display (LCD), and the like. In addition, the OPU 26 may be provided with a touch panel.

The recording head 27 includes the plurality of nozzles to discharge ink. In the present example, the plurality of nozzles is arranged in a line at regular intervals along the longitudinal direction of the recording head 27. Alternatively, the plurality of nozzles may be arranged in two or more lines. The recording head 27 may employ a piezoelectric method for applying a voltage and deforming a piezoelectric element to discharge ink. Alternatively, the recording head 27 may employ a thermal method for applying heat to ink to generate bubbles, thereby expelling and discharging the ink.

The recording head drive circuit 28 receives print data for printing and print timing information for instructing the print timing. According to the print timing instructed based on the print timing information, the recording head drive circuit 28 controls the driving of the recording head 27 to discharge ink onto the medium 12 according to the print data. In order to control the driving of the recording head 27, the recording head drive circuit 28 generates the drive waveform data for driving the recording head 27.

When the communication I/F 22 receives a print job (or image data) from the smart device 11, the control unit 25 calculates the position of each nozzle of the recording head 27 based on input information from the two or more navigation sensors 24. The image data thus received is stored in the memory 23. The user holds the handheld printer 10 with one hand and freely moves the handheld printer 10, thereby scanning on the medium 12. The control unit 25 continues calculating the position of each nozzle during the scanning. Then, the control unit 25 acquires a peripheral image alone from the memory 23. The peripheral image is an image in a given area corresponding to the position thus calculated.

The control unit 25 compares the positions of the image elements forming the peripheral images thus acquired with the calculated positions of the nozzles. When determining that one or more nozzles are within the tolerance, the control unit 25 transmits the print data for the one or more nozzles to the recording head drive circuit 28. The recording head drive circuit 28 generates the drive waveform data of the recording head 27. The recording head 27 discharges ink from the one or more nozzles according to the drive waveform data, thereby printing.

Referring now to FIG. 3, a detailed description is given of a configuration and functions of the control unit 25 included in the handheld printer 10 described above.

FIG. 3 is a block diagram illustrating the configuration of the control unit 25.

As described above, the control unit 25 includes the SoC 30 and the ASIC/FPGA 40. The SoC 30 includes a CPU 31, a memory controller (CTL) 32, and a position calculation circuit 33. The CPU 31 generally controls the handheld printer 10. The memory CTL 32 controls the memory 23. The position calculation circuit 33 calculates the position of the navigation sensor 24 and the position of each nozzle. The CPU 31, the memory CTL 32, and the position calculation circuit 33 are connected to the bus 34 to exchange, e.g., data via the bus 34.

The ASIC/FPGA 40 includes a navigation sensor I/F 41, a timing generation circuit 42, a recording head control circuit 43, an image random-access memory (RAM) 44, a direct memory access controller (DMAC) 45, a rotator 46, and an interrupt circuit 47. The navigation sensor I/F 41, the timing generation circuit 42, the recording head control circuit 43, the image RAM 44, the DMAC 45, the rotator 46, and the interrupt circuit 47 are connected to a bus 48 to exchange, e.g., data via the bus 48. Note that the bus 48 is connected to the bus 34, allowing the SoC 30 and the ASIC/FPGA 40 to exchange, e.g., data via the buses 34 and 48.

The navigation sensor I/F 41 communicates with the navigation sensor 24. The navigation sensor I/F 41 receives output values dX and dY from the navigation sensor 24 and stores the output values dX and dY in an internal register as an internal memory. The timing generation circuit 42 generates information of the time at which the navigation sensor 24 emits light and acquires reflected light from the medium 12 as image data. The timing generation circuit 42 notifies the navigation sensor I/F 41 of the information. In short, the timing generation circuit 42 instructs the timing of reading the medium 12. The timing generation circuit 42 also generates information of the timing of driving the recording head 27 and notifies the recording head control circuit 43 of the information. In short, the timing generation circuit 42 instructs the timing of discharging ink from the plurality of nozzles for printing.

The DMAC 45 reads, from the memory 23, image data of the peripheral image of the nozzles of the recording head 27 based on the positional information calculated by the position calculation circuit 33. The image RAM 44 temporarily stores the image data of the peripheral image read by the DMAC 45. The rotator 46 rotates the peripheral image according to the tilt and the head position designated by the user. The rotator 46 outputs the peripheral image thus rotated to the recording head control circuit 43. The rotator 46 acquires, e.g., the rotational angle calculated by the position calculation circuit 33 upon calculation of the position coordinates. By use of the rotational angle, the rotator 46 rotates the peripheral image.

The recording head control circuit 43 generates a control signal from the information of the timing of driving the recording head 27 and receives the image data of the peripheral image output from the rotator 46 to determine the nozzles to discharge ink. According to the determination and the information of the timing, the recording head control circuit 43 outputs, to the recording head drive circuit 28, the print data and information of the nozzles that discharge ink.

The interrupt circuit 47 notifies the SoC 30 that the navigation sensor I/F 41 terminates communication with the navigation sensor 24. The interrupt circuit 47 also notifies the SoC 30 of status information such as an error.

Figure 4:
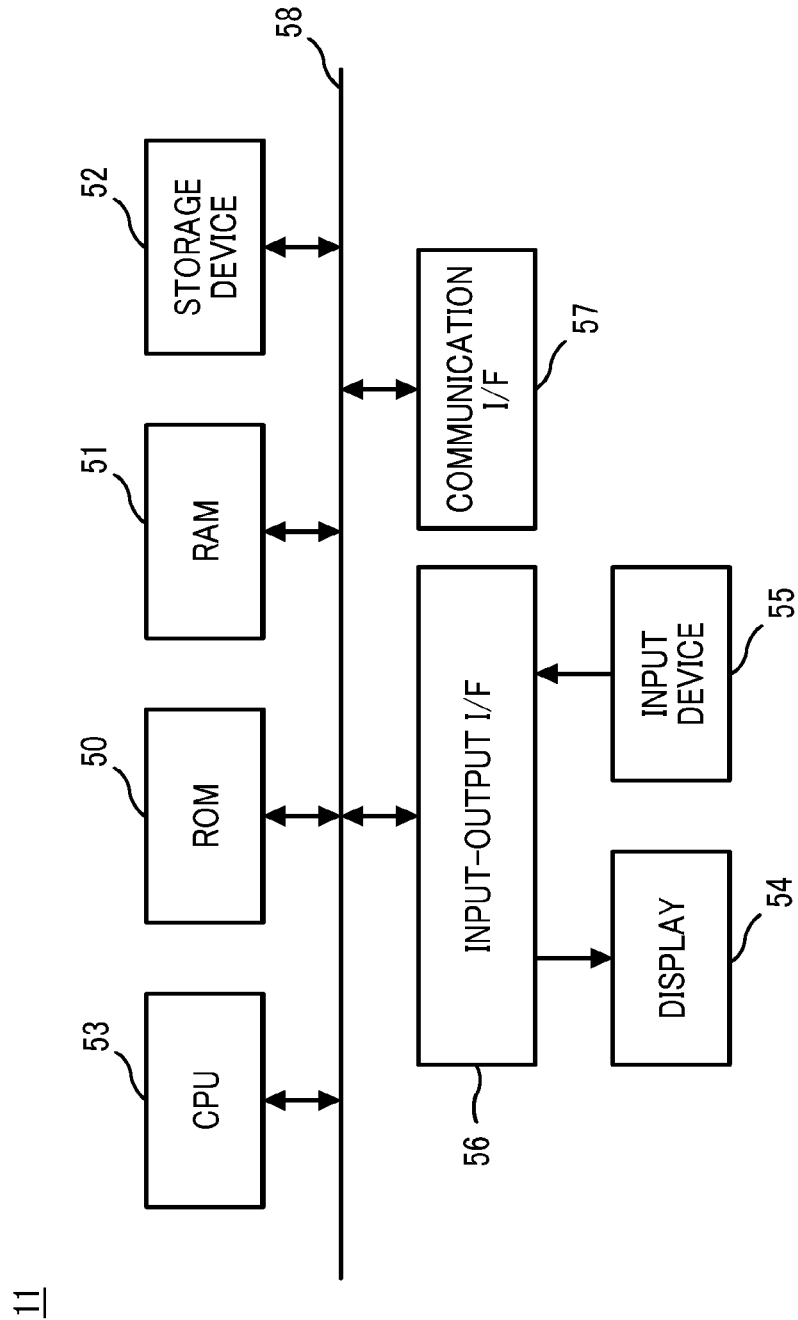
FIG. 4 is a block diagram illustrating a hardware configuration of the smart device.

Referring now to FIG. 4, a description is given of a hardware configuration of the smart device 11.

FIG. 4 is a block diagram illustrating the hardware configuration of the smart device 11.

Similar to the handheld printer 10, the smart device 11 includes a read-only memory (ROM) 50 and a RAM 51 that serves as a working space. The smart device 11 further includes a readable/writable storage device 52, such as a flash memory, which stores image data, an application for opening the image data and instructing printing, an operating system (OS), and the like.

The smart device 11 further includes a CPU 53, a display 54, and an input device 55. The CPU 53 retrieves the application from the storage device 52 to the RAM 51 and executes the application. The display 54 displays an image. A user, for example, inputs a print instruction of the image with the input device 55. In the present example, the display 54 and the input device 55 are provided as separate devices. Alternatively, a touch panel may be provided with functions of the display 54 and the input device 55. The display 54 and the input device 55 are connected to an input-output I/F 56, which controls display and input of information.

The smart device 11 further includes a communication I/F 57 for the wireless communication with the handheld printer 10. The ROM 50, the RAM 51, the storage device 52, the CPU 53, the input-output I/F 56, and the communication I/F 57 are connected to a bus 58 to exchange, e.g., data with each other via the bus 58.

Figure 5:
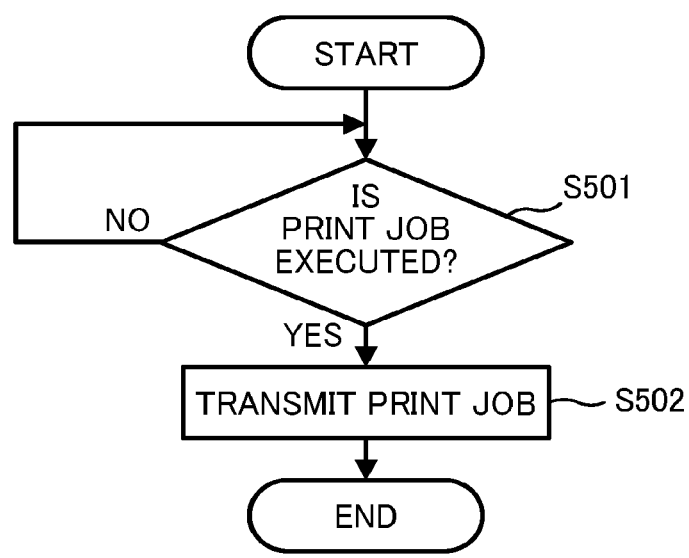
FIG. 5 is a flowchart of a process executed on the smart device side to form an image on a medium.
Figure 6:
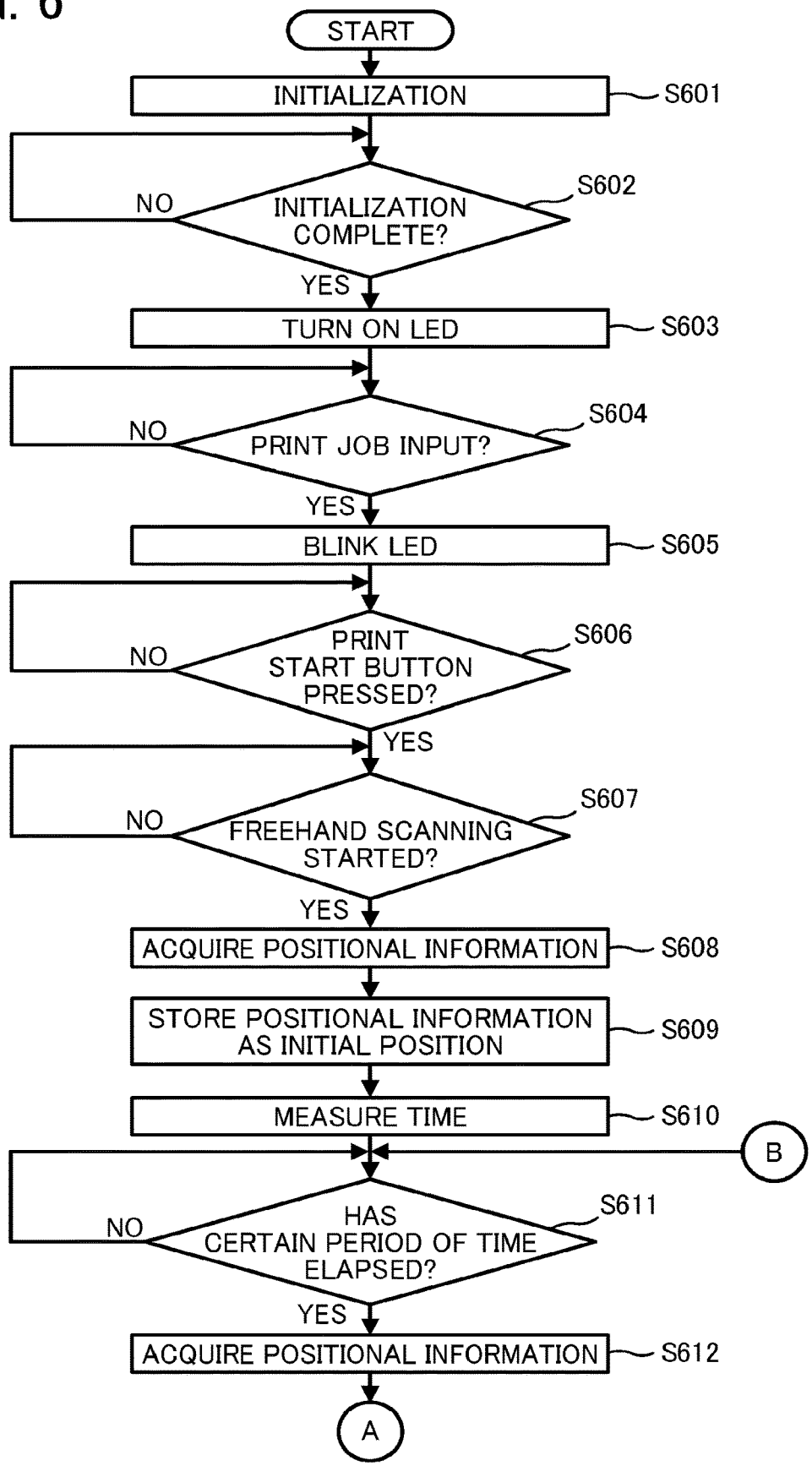
FIG. 6 is a flowchart of a process executed on the handheld printer side to form the image on the medium.
Figure 7:
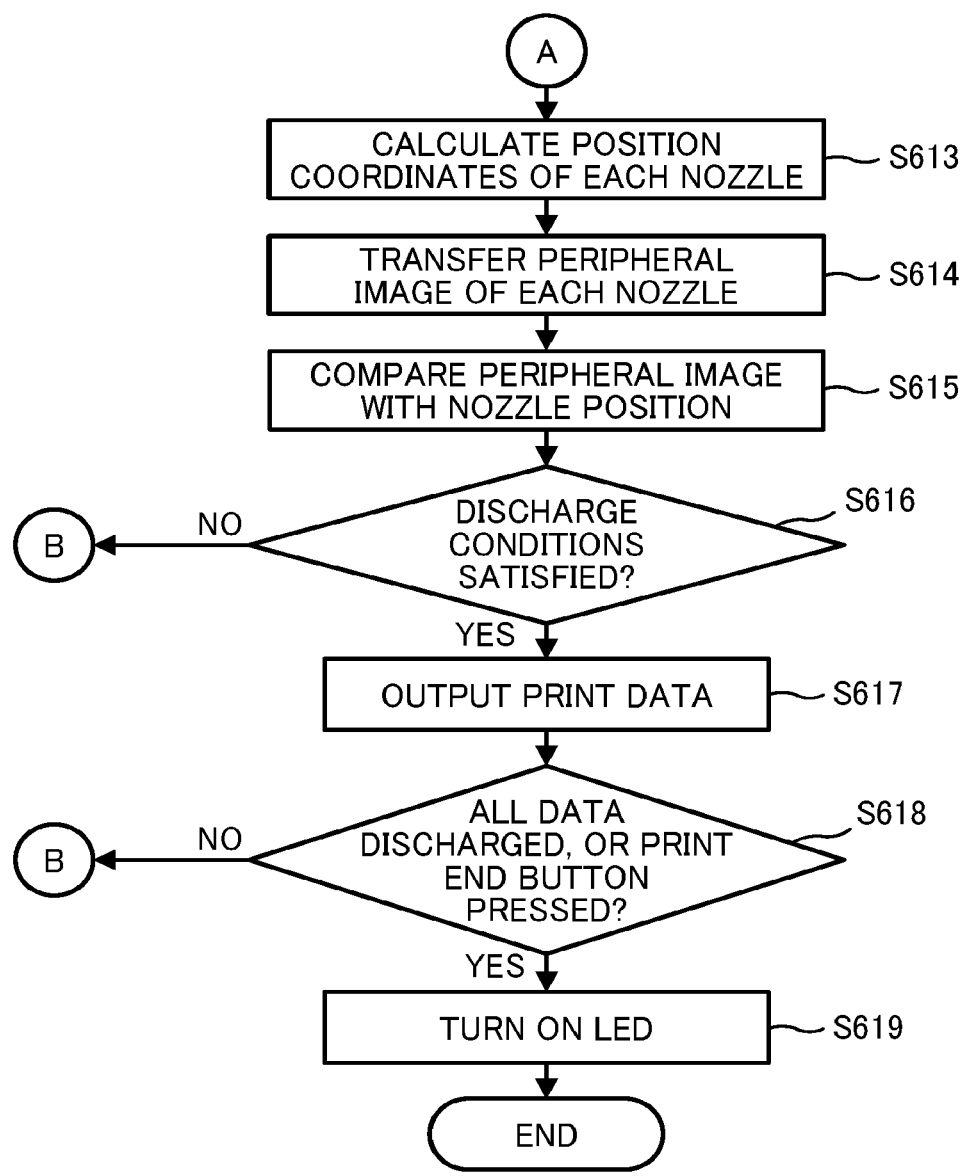
FIG. 7 is a continuation of the flowchart of the process executed on the handheld printer side to form the image on the medium in FIG. 6.

Referring now to FIGS. 5 to 7, a description is given of processes executed on the smart device 11 side and on the handheld printer 10 side to form an image on the medium 12.

Initially with reference to FIG. 5, a description is given of the process executed on the smart device 11 side.

FIG. 5 is a flowchart of the process executed on the smart device 11 side.

In step S501, a user selects data to be printed and gives a print instruction to the smart device 11. When a print job is not executed by the smart device 11 (NO in step S501), the user waits for the print job to be executed.

Meanwhile, the smart device 11 starts an application, displays images subjected to selection by the user, and receives the print instruction. With a printer driver, the smart device 11 converts the print instruction into a print command and transmits the print command, thereby executing the print job. Alternatively, the smart device 11 may transmit image data as is in a data format such as a tagged image file format (TIFF) or Joint Photographic Expert Group (JPEG), thereby executing the print job.

When the print job is executed by the smart device 11 (YES in step S501), the process proceeds to step S502.

In step S502, the smart device 11 transmits the print job to the handheld printer 10. The user holds the handheld printer 10 with a hand, determines an initial position as a print start position on the medium 12, such as a notebook, to print the image on the medium 12. The user then presses the print start button and perform freehand scanning on a flat surface of the medium 12 to form the image on the medium 12. When the print job is complete, the process ends.

Referring now to FIGS. 6 and 7, a description is given of the process executed on the handheld printer 10 side.

FIG. 6 is a flowchart of the process executed on the handheld printer 10 side. FIG. 7 is a continuation of the flowchart of the process executed on the handheld printer 10 side in FIG. 6.

When a user presses a power button of the handheld printer 10, the handheld printer 10 accepts that the power button is pressed. The handheld printer 10 is supplied with power from, e.g., a cell or a battery and activated to start the process.

In step S601, the SoC 30 initializes the handheld printer 10. In the initialization, the navigation sensor 24 and the circuits are activated.

In step S602, the control unit 25 determines whether the initialization is complete. When the initialization is not complete (NO in step S602), the control unit 25 waits for the initialization to be complete. On the other hand, when the initialization is complete (YES in step S602), the process proceeds to step S603.

In step S603, the SoC 30 turns on the LED, thereby notifying the user that the handheld printer 10 is ready for use.

In step S604, the SoC 30 determines whether the print job is input or received from the smart device 11. When the print job is not input (NO in step S604), the SoC 30 determines again whether the print job is input from the smart device 11. The SoC 30 repeats the determination until the print job is input. On the other hand, when the print job is input (YES in step S604), the process proceeds to step S605.

In step S605, the handheld printer 10 reads an image of the image data included in the print job and blinks the LED. When the print job includes the print command, the handheld printer 10 generates an image from the print command, and then blinks the LED.

In step S606, the control unit 25 determines whether the print start button is pressed. When the print start button is not pressed (NO in step S606), the control unit 25 waits for the print start button to be pressed.

On the other hand, when the user presses the print start button of the handheld printer 10 (YES in step S606), the process proceeds to step S607.

In step S607, the SoC 30 determines whether the user starts the freehand scanning. When the freehand scanning is not started (NO in step S607), the SoC 30 waits for the freehand scanning to be started.

When the freehand scanning is started (YES in step S607), the process proceeds to step S608.

In step S608, the navigation sensor 24 detects the current position of the handheld printer 10 as a start position and acquires the positional information.

In step S609, the SoC 30 stores the positional information as an initial position in the internal memory via the navigation sensor I/F 41.

In step S610, the time is measured with a counter of the timing generation circuit 42 provided in the handheld printer 10.

In step S611, the control unit 25 determines whether a certain period of time has elapsed. Specifically, the control unit 25 determines whether the certain period of time has elapsed based on whether the time reaches a time set to acquire the positional information with the navigation sensor 24. When the certain period of time has not elapsed (NO in step S611), the control unit 25 waits for the certain period of time to elapse. On the other hand, when the certain period of time has elapsed and reached the time to detect the current position (YES in step S611), the process proceeds to step S612.

In step S612, the navigation sensor 24 detects the current position. Similar to the positional information of the start position, the SoC 30 acquires and stores the positional information of the detected position in the internal memory.

The navigation sensor 24 of the handheld printer 10 detects the initial position designated by the user. Subsequently, the navigation sensor 24 performs automatic reading and calculates the moving amount (Δx, Δy). The navigation sensor 24 then outputs, as a sensor output value, the moving amount calculated at certain time intervals. The sensor output value is stored in the internal memory as described above. The position calculation circuit 33 calculates the rotational angle and the position of the recording head 27, based on the sensor output value thus stored. The position calculation circuit 33 calculates the position of the recording head 27 as two-dimensional position coordinates. The position calculation circuit 33 then notifies the ASIC/FPGA 40 of the rotational angle and the position of the recording head 27 thus calculated.

In step S613 illustrated in FIG. 7, the ASIC/FPGA 40 calculates the position coordinates of each nozzle mounted on the recording head 27 from the rotational angle and the position coordinates of the recording head 27 calculated and from relative installation positions of the navigation sensor 24 and the recording head 27 predetermined.

In step S614, the image data around each nozzle is transferred from the memory 23 to the image RAM 44, based on the position coordinates of each nozzle. Then, the rotator 46 rotates the peripheral image in the image data according to the position and the tilt of the recording head 27 designated by the user.

In step S615, the ASIC/FPGA 40 compares the position coordinates of the image data transferred and the position coordinates of each nozzle calculated.

In step S616, the ASIC/FPGA 40 determines whether set discharge conditions are satisfied. Specifically, based on whether the position of each nozzle is within the tolerance of position coordinates of the image data, the ASIC/FPGA 40 determines whether the discharge conditions are satisfied.

When the discharge conditions are not satisfied (NO in step S616), the process returns to step S611. On the other hand, when the discharge conditions are satisfied (YES in step S616), the process proceeds to step S617.

In step S617, the corresponding image data is output to the recording head control circuit 43 to cause the recording head 27 to discharge the ink.

In step S618, the control unit 25 determines whether all data is discharged or whether a print end button is pressed.

When the discharging of all data is not complete or when the print end button is not pressed (NO in step S618), the process returns to step S611 to form an image on the medium 12. On the other hand, when the discharging of all data is complete or when the print end button is pressed (YES in step S618), the process proceeds to step S619.

In step S619, the SoC 30 turns on the LED to notify the user that the printing is complete. Thus, the process ends.

In the example described above, the SoC 30 stores the positional information and turns on the LED, for example. On the other hand, the ASIC/FPGA 40 calculates the position coordinates of each nozzle, compares position coordinates, and determines whether the discharge conditions are satisfied. The separation of the roles may change between the SoC 30 and the ASIC/FPGA 40 depending on, e.g., the CPU performance or the circuit size of the ASIC/FPGA 40. For example, the SoC 30 may perform a part of the above-described steps executed by the ASIC/FPGA 40.

The image to be printed may be stored in the smart device 11 as image data. Alternatively, the image to be printed may be acquired from another device capable of communicating with the smart device 11. Alternatively, the image to be printed may be created by the smart device 11 as illustrated in FIG. 8.

Figure 8:
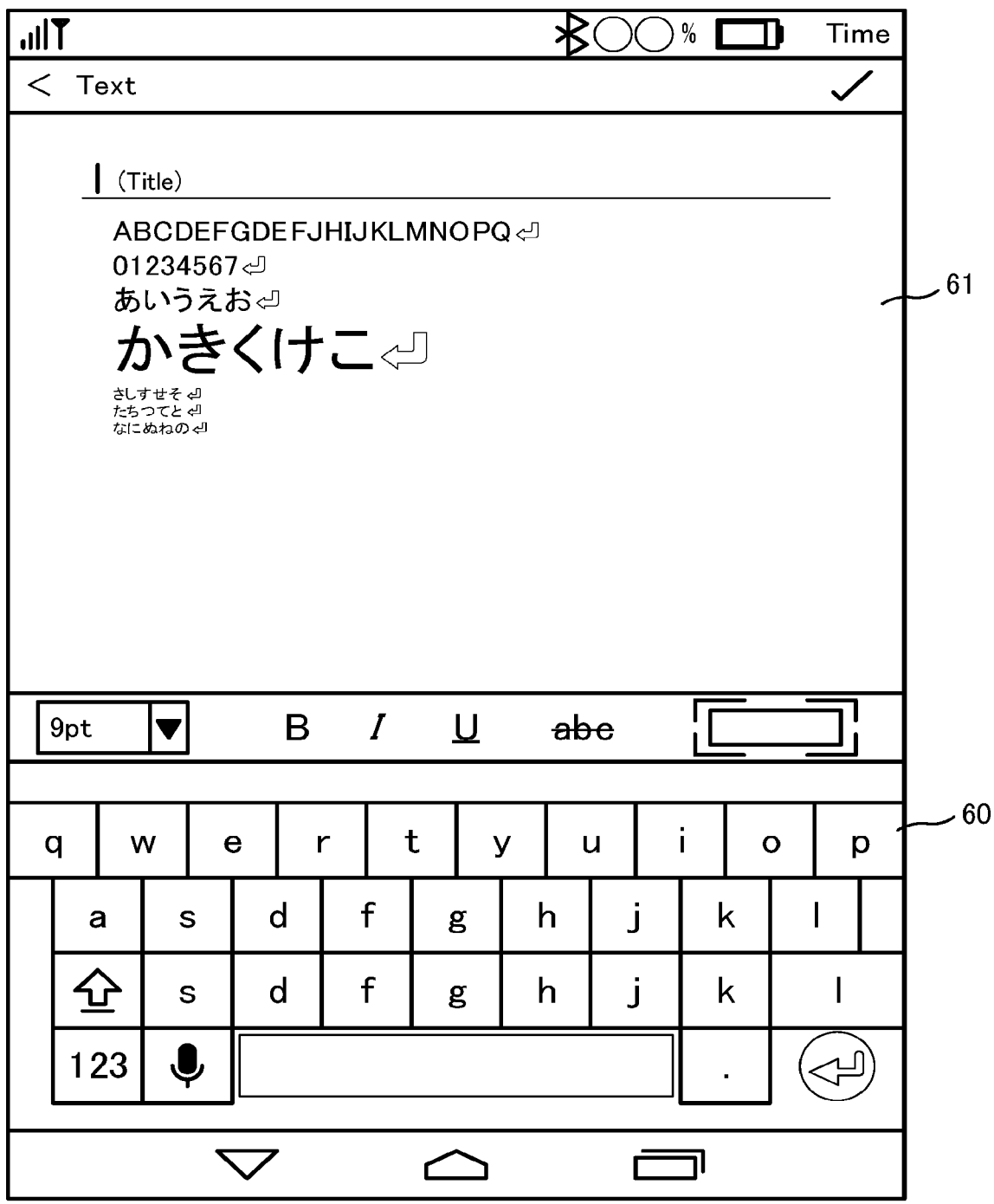
FIG. 8 is a diagram illustrating an example of text data generated by the smart device.

FIG. 8 is a diagram illustrating an example of text data generated by the smart device 11.

The user activates an application installed in the smart device 11 to generate text data to be printed on the application.

The smart device 11 includes a touch panel capable of receiving and displaying information. The touch panel displays a keyboard 60 with which a user inputs information. A display screen 61 displays the information (or text) input with the keyboard 60. Image data is hereinafter described as text data. The image data may include an image alone or may include an image and text.

The text data includes a character string of at least one of, e.g., alphabetic characters, hiragana characters, katakana characters, kanji characters, and numerals. The characters are set to a given character size and can be decorated. For example, the characters can be bold or underlined. The characters may all have the same size or may have different sizes. The user inputs the characters with, e.g., the keyboard 60. The character string input by the user is broken by line feed code input by the user or may be automatically broken when the character string reaches a set print width. Thus, a plurality of character string lines constructs text data. The text data is stored as print data.

The user transmits the print data thus stored to the handheld printer 10, thereby printing the text data on the medium 12. The handheld printer 10 prints the print data in separate batches.

Figure 9:
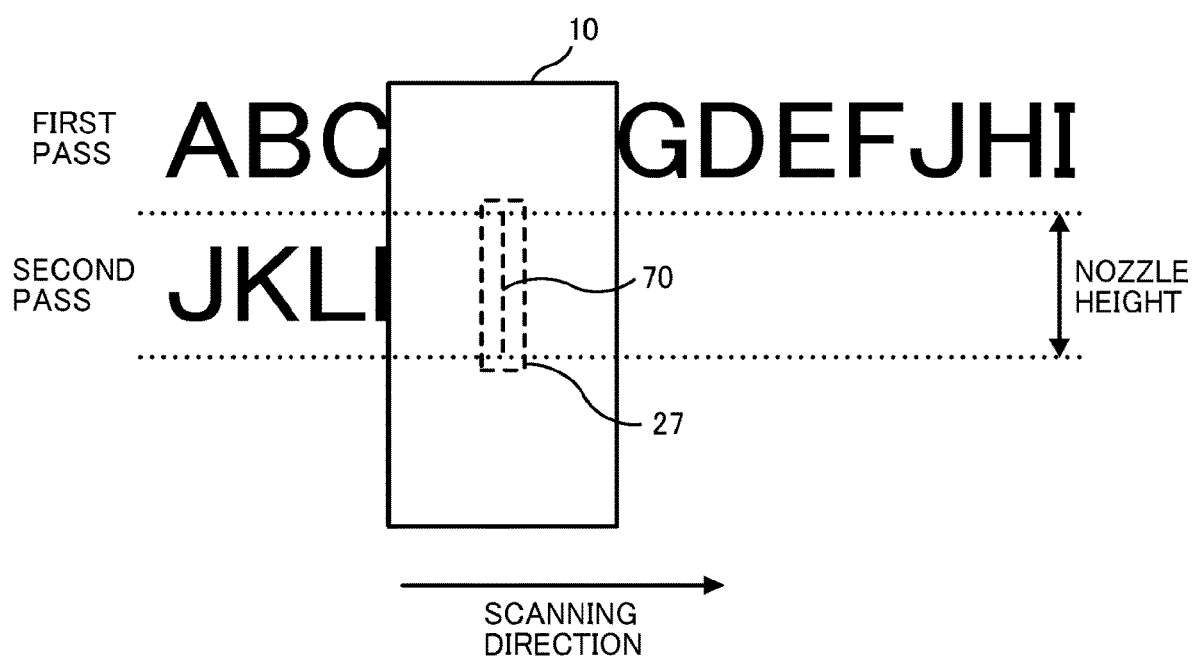
FIG. 9 is a diagram illustrating nozzles of a recording head and an area printable in one batch.

Referring now to FIG. 9, a description is given of nozzles and an area printable in one batch.

FIG. 9 is a diagram illustrating a plurality of nozzles 70 of the recording head 27 and the area printable in one batch.

The handheld printer 10 is provided with the recording head 27 on the surface facing the medium 12. The plurality of nozzles 70 is arranged in a line on the recording head 27.

FIG. 9 illustrates the plurality of nozzles 70 as a line. The handheld printer 10 discharges ink, as moved by the user in a given direction (i.e., scanning direction), to print a part of the text data on the medium 12. The maximum length in a direction perpendicular to the scanning direction is equal to a nozzle height, which is the length of the plurality of nozzles 70 serving as a droplet discharger, illustrated as a line in FIG. 9.

Therefore, when the print data is greater than the nozzle height, the print data is divided conforming to the nozzle height into pass data, which is sub-image data to be printed by one movement.

In the example illustrated in FIG. 9, two lines of horizontally written text are divided in a vertical direction into two, conforming to the nozzle height. Thus, two pieces of pass data are generated. The text is printed according to the two pieces of pass data.

With respect to text printing, the handheld printer 10 is placed at an initial position and moved in the scanning direction from the initial position to print the first line (or first pass) of text. Thereafter, the handheld printer 10 is moved in the scanning direction from a start position of the second pass to print the second pass of text. The start position of the second pass is a position shifted from the initial position in the direction perpendicular to the scanning direction by the nozzle height. A ruler or the like may be used to move the handheld printer 10 straight in the scanning direction.

Figure 10:
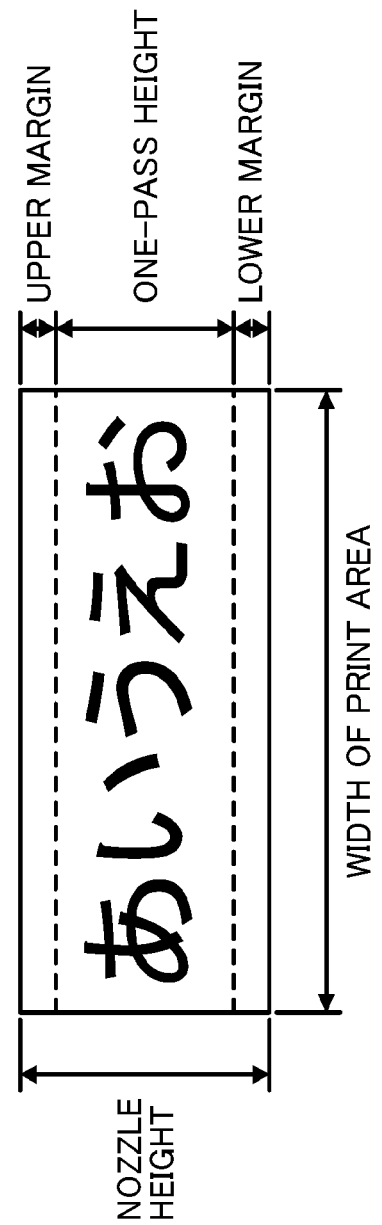
FIG. 10 is a diagram illustrating a one-pass height.

"One-pass height" is herein defined as a printable length in the direction perpendicular to the scanning direction by one movement of the handheld printer 10. The one-pass height is determined as a length obtained by subtracting upper and lower margins (or blank areas) from the nozzle height, as illustrated in FIG. 10. Accordingly, the area printable by one movement (or image forming range by one movement) is defined by the one-pass height and a width of a print area in the scanning direction.

The upper and lower margins are determined in advance to prevent an overlap of the print areas for the respective passes when the handheld printer 10 is operated by hand. Note that the margins may be omitted provided that the handheld printer 10 is operable while preventing the overlap of the print areas for the respective passes. A length (or quantity) of each of the upper and lower margins is in a range of 0 mm to X mm and preferably changeable by the user. Note that the X is a real number greater than 0.

In a case in which the upper and lower margins are provided as described above, several pieces of pass data are generated from the print data in consideration of the upper and lower margins.

Figure 11:
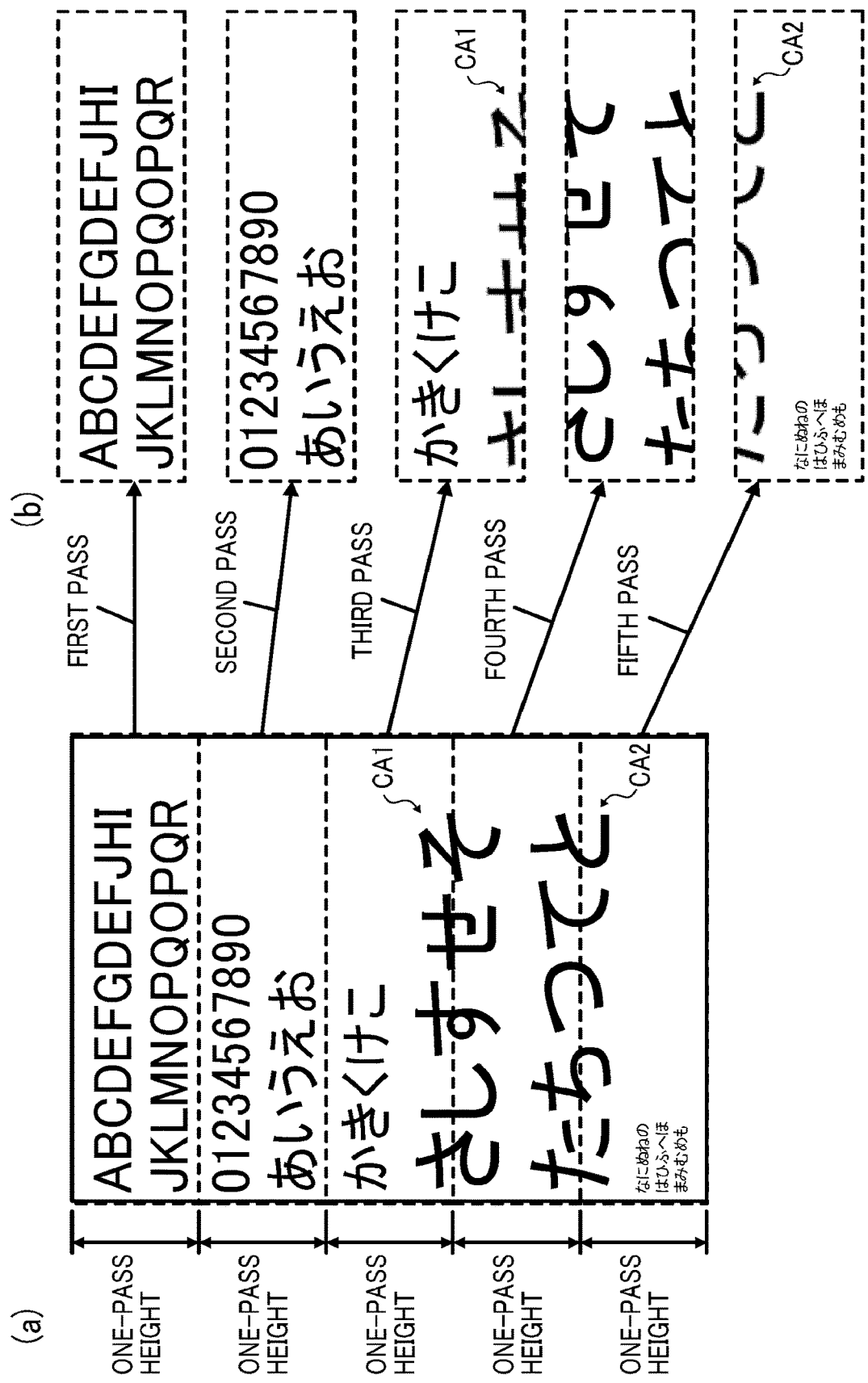
FIG. 11 is a diagram illustrating a way to generate pass data from text data.

Referring now to FIG. 11, a description is given of a way to generate several pieces of pass data from the print data.

A simplest way to generate pass data is to equally divide, e.g., text data by the one-pass height.

Section (a) in FIG. 11 illustrates an example of text data as print data. Section (b) in FIG. 11 illustrates several pieces of pass data generated by equally dividing the text data by the one-pass height.

When horizontally written text data as illustrated in Section (a) in FIG. 11 is equally divided in the vertical direction by the one-pass height, five pieces of pass data (i.e., data for five passes) is generated as illustrated in Section (b) in FIG. 11. In the example illustrated in FIG. 11, a character area CA1 is present as an image element at a boundary between the data of the third pass and the data of the fourth pass. When the pass data is generated, the character area CA1 is divided into two.

When the handheld printer 10 performs printing, white stripes and overlaps are likely to occur between passes. When the text is printed according to the pass data, white stripes and overlaps may occur in the character area CA1, hampering recognition of the characters as text and reducing the readability.

Similarly, a character area CA2 is present at a boundary between the fourth pass and the fifth pass. When the pass data is generated, the character area CA2 is divided into two as described above.

On the other hand, with regard to the first pass and the second pass, character areas do not overlap the boundary between the passes, that is, the character areas are not divided into two. In other words, no white stripes or overlaps occur in the character areas.

According to the present embodiment, a data generation system is mounted to generate pass data while preventing such white stripes and overlaps.

Figure 12A:
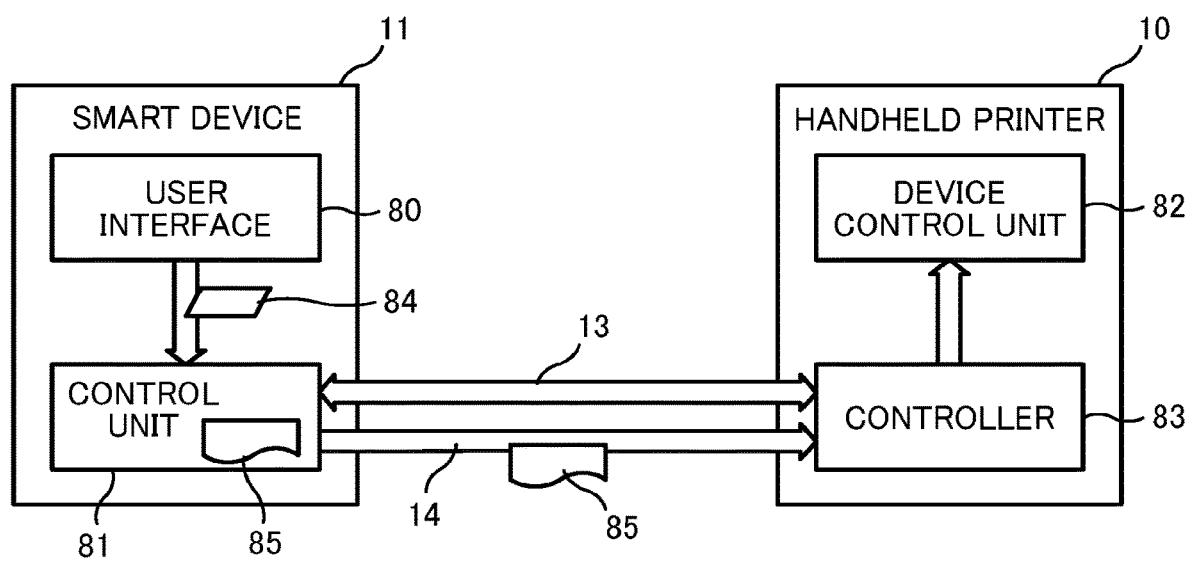
FIG. 12A is a block diagram illustrating an example in which a data generation system is mounted on the smart device.
Figure 12B:
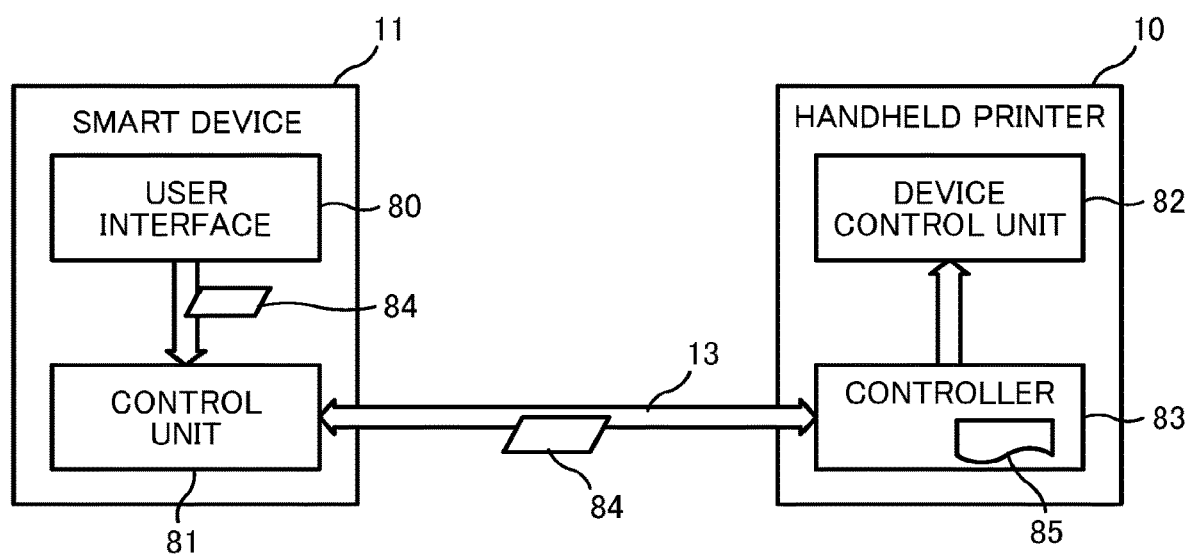
FIG. 12B is a block diagram illustrating an example in which the data generation system is mounted on the handheld printer.

Referring now to FIGS. 12A and 12B, a description is given of the data generation system.

As illustrated in FIGS. 12A and 12B, the data generation system may be mounted on either the handheld printer 10 or the smart device 11. Alternatively, the data generation system may be mounted on another device, such as a server device, accessible by either or both of the handheld printer 10 and the smart device 11.

FIG. 12A is a diagram illustrating an example in which the data generation system is mounted on the smart device 11. FIG. 12B is a diagram illustrating an example in which the data generation system is mounted on the handheld printer 10.

The smart device 11 and the handheld printer 10 communicate with each other through a command protocol 13 and a data protocol 14 to control, e.g., status management of the devices and printing. As illustrated in FIGS. 12A and 12B, the smart device 11 generally includes a user interface 80 and a control unit 81. With the user interface 80 that includes, e.g., the display 54 and the input device 55, the smart device 11 exchanges information with the user. The control unit 81 includes, e.g., the ROM 50, the RAM 51, the storage device 52, and the CPU 53. By contrast, the handheld printer 10 generally includes a device control unit 82 and a controller 83. The device control unit 82 includes, e.g., the recording head control circuit 43. The controller 83 includes, e.g., the memory 23 and the control unit 25.

In a case in which the data generation system is mounted on the smart device 11, the data generation system is implemented by the control unit 81. The control unit 81 receives print data 84 from the user interface 80 and generates pass data 85. By contrast, in a case in which the data generation system is mounted on the handheld printer 10, the data generation system is implemented by the controller 83. The controller 83 acquires the print data 84 from the smart device 11 and generates the pass data 85.

The control unit 81 generates at least one functional unit that constructs the data generation system, with the CPU 53 executing a program or program code stored in the storage device 52. The control unit 81 generates the pass data 85 with the at least one functional unit thus generated. By contrast, the controller 83 generates at least one functional unit that constructs the data generation system, with the control unit 25 executing a program or program code stored in the memory 23. The controller 83 generates the pass data 85 with the at least one functional unit thus generated. The at least one functional unit is herein generated by execution of the program or program code. Alternatively, the at least one functional unit may be implemented by hardware such as a dedicated circuit. In a case in which multiple functional units are generated, some or all of the functional units may be implemented by hardware such as a dedicated circuit.

In the example illustrated in FIG. 12A, the user interface 80 of the smart device 11 generates the print data 84 and transmits the print data 84 thus generated to the control unit 81. The control unit 81 analyzes the print data 84 and generates the pass data 85. The control unit 81 transmits the pass data 85 thus generated to the handheld printer 10 through the data protocol 14.

In the handheld printer 10, the controller 83 (more specifically, the control unit 25) receives the pass data 85 from the smart device 11. The device control unit 82 processes the pass data 85 into data conforming to the nozzle shape for output with the recording head 27. The handheld printer 10 discharges ink from the nozzles according to the data processed by the device control unit 82, thus performing printing.

As the data generation system is mounted on the smart device 11, the configuration of the handheld printer 10 is simplified. On the other hand, as the smart device 11 transmits, to the handheld printer 10, the pass data 85 having a greater size than the size of the print data 84, the transmission speed decreases.

In the example illustrated in FIG. 12B, the user interface 80 of the smart device 11 generates the print data 84 and transmits the print data 84 thus generated to the control unit 81. The control unit 81 transmits the print data 84 as is to the handheld printer 10 through the command protocol 13.

In the handheld printer 10, the controller 83 (more specifically, the control unit 25) receives the print data 84 from the smart device 11 and generates the pass data 85 from the print data 84. The device control unit 82 processes the pass data 85 into data conforming to the nozzle shape for output with the recording head 27. The handheld printer 10 discharges ink from the nozzles according to the data processed by the device control unit 82, thus performing printing.

When the data generation system is mounted on the handheld printer 10, the smart device 11 transmits the print data 84 to the handheld printer 10. The print data 84 having a smaller size than the size of the pass data 85 increases the transmission speed and reduces the transmission time. On the other hand, since the handheld printer 10 generates the pass data 85, the load on the handheld printer 10 increases.

Figure 13:
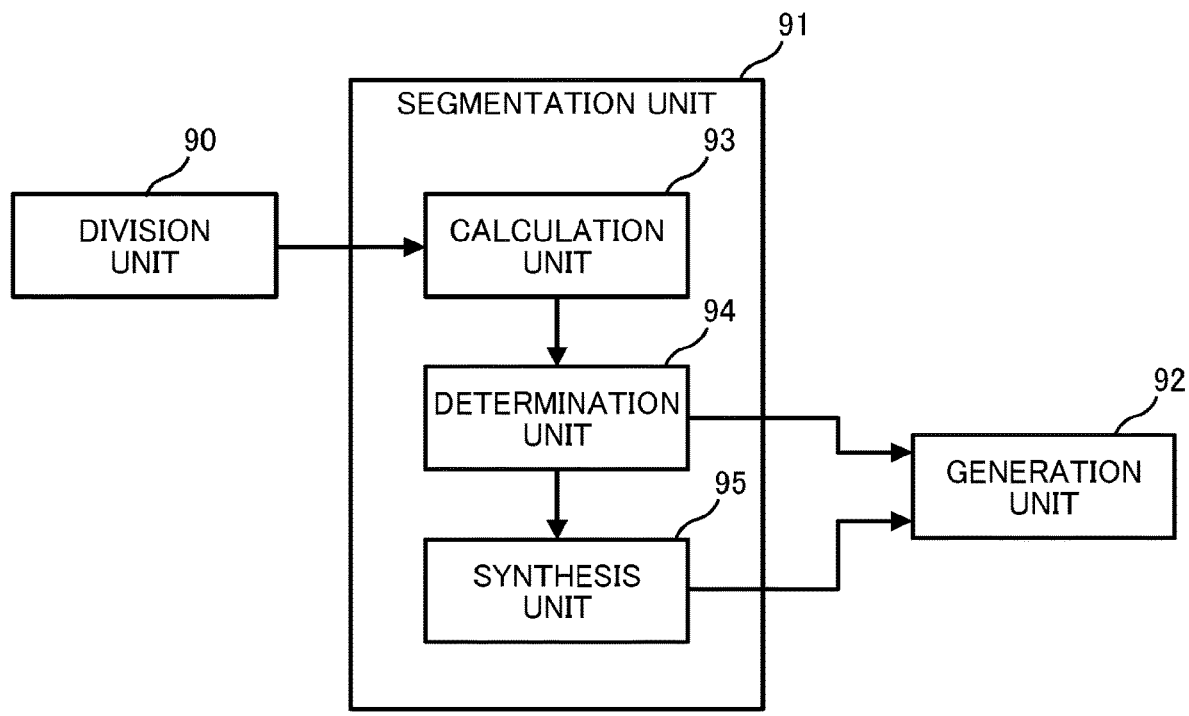
FIG. 13 is a diagram illustrating a first example of a functional configuration of the data generation system.
Figure 14:
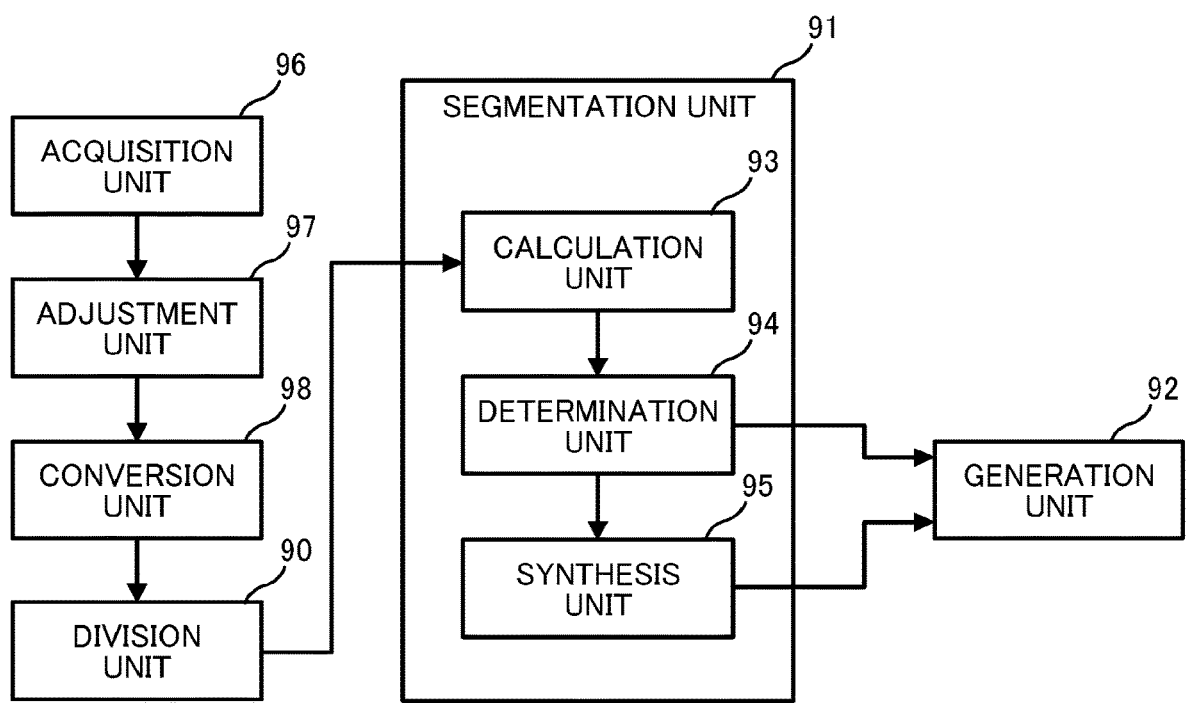
FIG. 14 is a diagram illustrating a second example of the functional configuration of the data generation system.

Referring now to FIGS. 13 and 14, a description is given of functional configuration examples of the data generation system.

Initially with reference to FIG. 13, a description is given of a first example of the functional configuration of the data generation system.

FIG. 13 is a diagram illustrating the first example of the functional configuration of the data generation system.

The data generation system includes at least a generation unit 92 as a functional unit. In the example illustrated in FIG. 13, the data generation system further includes a division unit 90 and a segmentation unit 91 as functional units. The division unit 90 divides an image into areas such that image elements constructing the image are not separated in the direction perpendicular to the given direction (i.e., scanning direction). Specifically, the division unit 90 divides the text into areas (e.g., character string lines) while keeping each character of the character strings constructing the text unseparated in the direction perpendicular to the scanning direction.

More specifically, the division unit 90 reads characters of text data one by one and renders character data. When rendering the character data, the division unit 90 uses font information included in the character data. The font information includes information of image and margin portions of a character. Specifically, the information of image and margin portions indicates where the image portion of the character is and where the margin portion is. In the rendering, the division unit 90 generates an image of one character including the margin portion. Thus, the division unit 90 renders the first character to the last character of the text data.

The text data includes line feed code, which signifies the end of a character string line. According to the line feed code, the division unit 90 extracts an image for one line from the data rendered, thereby dividing the text into individual character string lines.

The segmentation unit 91 arranges the individual character string lines into segments based on the one-pass height and a character height (i.e., pass height). The character height (i.e., pass height) is a length of each character string line in a vertical direction, which is the direction perpendicular to the scanning direction. Each of the segments includes the most continuous character string lines that fit within a printable range for one pass. Thus, the segmentation unit 91 determines at least one character string line to be included in a piece of pass data or one-pass data.

More specifically, the segmentation unit 91 combines one of the individual character string lines and a subsequent character string line. The segmentation unit 91 then determines whether the pass height of the character string lines thus combined is within the one-pass height. When the pass height of the character string lines combined is within the one-pass height, the segmentation unit 91 combines another character string line and the character string lines previously combined, to determine whether the pass height of the character string lines currently combined is within the one-pass height. The segmentation unit 91 repeats the above-described actions to determine, as the at least one character string line to be included in one-pass data, the most character string lines that fit within the one-pass height.

The generation unit 92 generates each pieces of pass data by use of the information of the at least one character string line arranged into a segment. Specifically, for example, when the first segment includes the first and second character string lines, the generation unit 92 uses the information of the first and second character string lines to generate a piece of pass data. Similarly, when the second segment includes the third and fourth character strings, the generation unit 92 uses the information of the third and fourth character string lines to generate a piece of pass data. The handheld printer 10 performs printing by use of the pass data thus generated.

The segmentation unit 91 includes a calculation unit 93, a determination unit 94, and a synthesis unit 95, so as to determine the at least one character string line to be included in one-pass data. The calculation unit 93 calculates, as a pass height, the character height of one line. The calculation unit 93 also calculates, as a pass height, a vertical length (i.e., height) of a combination (or a synthesis area) of two or more character string lines. The determination unit 94 determines whether the pass height calculated by the calculation unit 93 is equal to or less than the one-pass height, so that the synthesis unit 95 arranges the individual character string lines into segments each fitting within the one-pass height.

When the pass height calculated is equal to or less than the one-pass height, a combination of a last character string line of the two or more character string lines and one or more preceding character string lines of the two or more character string lines fits within the one-pass height. Accordingly, the synthesis unit 95 synthesizes the last character string line and the one or more preceding character string lines, so that the combination is included in one-pass data. On the other hand, the pass height calculated exceeds the one-pass height, the combination of the last character string line and the one or more preceding character string lines exceeds the one-pass height. Accordingly, the synthesis unit 95 does not synthesize the last character string line and the one or more preceding character string lines, so that the one or more preceding character string lines alone are included in one-pass data.

The calculation unit 93 calculates a pass height of a combination of the continuous character string lines synthesized by the synthesis unit 95 and a subsequent character string line. The determination unit 94 determines whether the pass height thus calculated is equal to or less than the one-pass height. When the pass height calculated is equal to or less than the one-pass height, the synthesis unit 95 synthesizes the continuous character string lines and the subsequent character string line. The segmentation unit 91 repeats the above-described actions to determine at least one character string line to be included in one pass.

The data generation system may have another functional configuration instead of the functional configuration described above with reference to FIG. 13.

Referring now to reference to FIG. 14, a description is given of a second example of the functional configuration of the data generation system.

FIG. 14 is a diagram illustrating the second example of the functional configuration of the data generation system.

In the example illustrated in FIG. 14, the data generation system includes an acquisition unit 96, an adjustment unit 97, and a conversion unit 98. The acquisition unit 96 acquires the print data 84 including, e.g., image information, character code, character size, and font type. The image information includes information of, e.g., vertical writing or horizontal writing, the start position of a character, and intervals such as character intervals and line intervals. Such pieces of information obtainable from the print data 84 specify the size of an image to be generated and the position at which the image is generated. The acquisition unit 96 acquires the print data 84 from, e.g., the user interface 80.

The adjustment unit 97 calculates the length of the image in the scanning direction, that is, the image width, from the print data 84 acquired by the acquisition unit 96. When the image width is greater than the width of the print area (herein referred to as a one-pass width), the adjustment unit 97 inserts a line feed or new line in a character string, for example, thereby adjusting the image width to be equal to or less than the one-pass width.

The conversion unit 98 renders the print data 84. Specifically, the conversion unit 98 converts the print data 84 into an image according to the information included in the print data 84, such as the image information, the character code, the character size, and the font type. Based on the image as a result of conversion by the conversion unit 98, the calculation unit 93 calculates the pass height, which may be the character height or the height of a combination of two or more character string lines.

As described above, a line feed code of text signifies the end of a character string line. In a case of an image instead of text, any vertical size and width can be set to divide the image in the scanning direction by the width.

The division unit 90 and the segmentation unit 91 may be omitted, provided that the pass data is generated such that one piece of pass data includes characters constructing an image while keeping each character undivided into two. In this case, when the generation unit 92 attempts to pack character string lines into one pass as a first pass while referring to the image, and when one of the character string lines does not fit within the first pass, the generation unit 92 generates pass data without the one of the character string lines. In short, the generation unit 92 extracts one or more character string lines that fit within the one-pass height, thereby generating pass data of the first pass that includes the one or more character string lines. With regard to the character string line excluded from the first pass, the generation unit 92 may incorporate the character string line into a second pass adjacent to the first pass, thereby generating pass data of the second pass including the character string line. Alternatively, in a case in which the division unit 90 is used to divide the image into character string lines, the generation unit 92 may generate, as one-pass data, data of a character string line that fits within the one-pass height.

Figure 15:
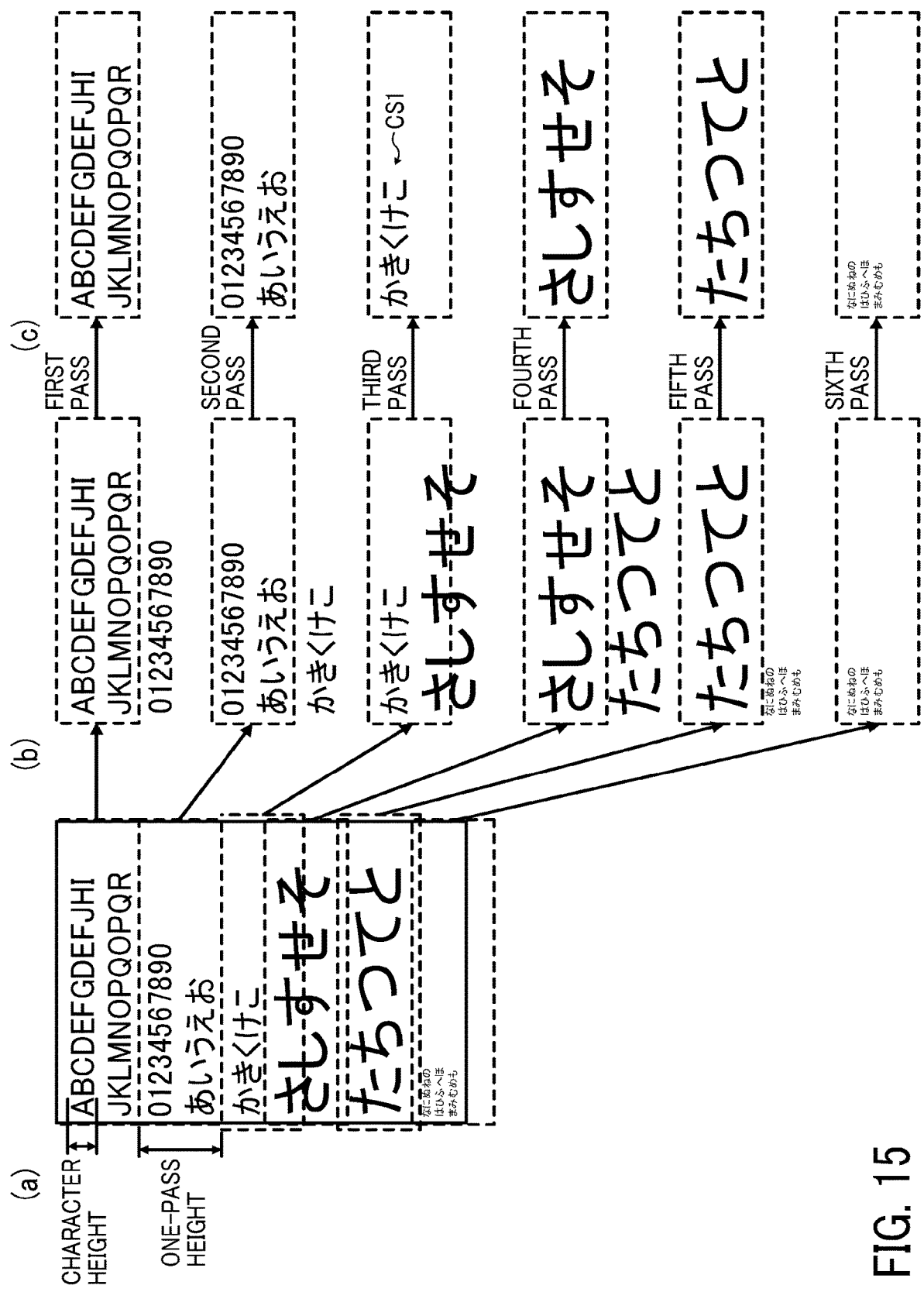
FIG. 15 is a diagram illustrating a way to generate pass data from horizontally written text data.
Figure 16:
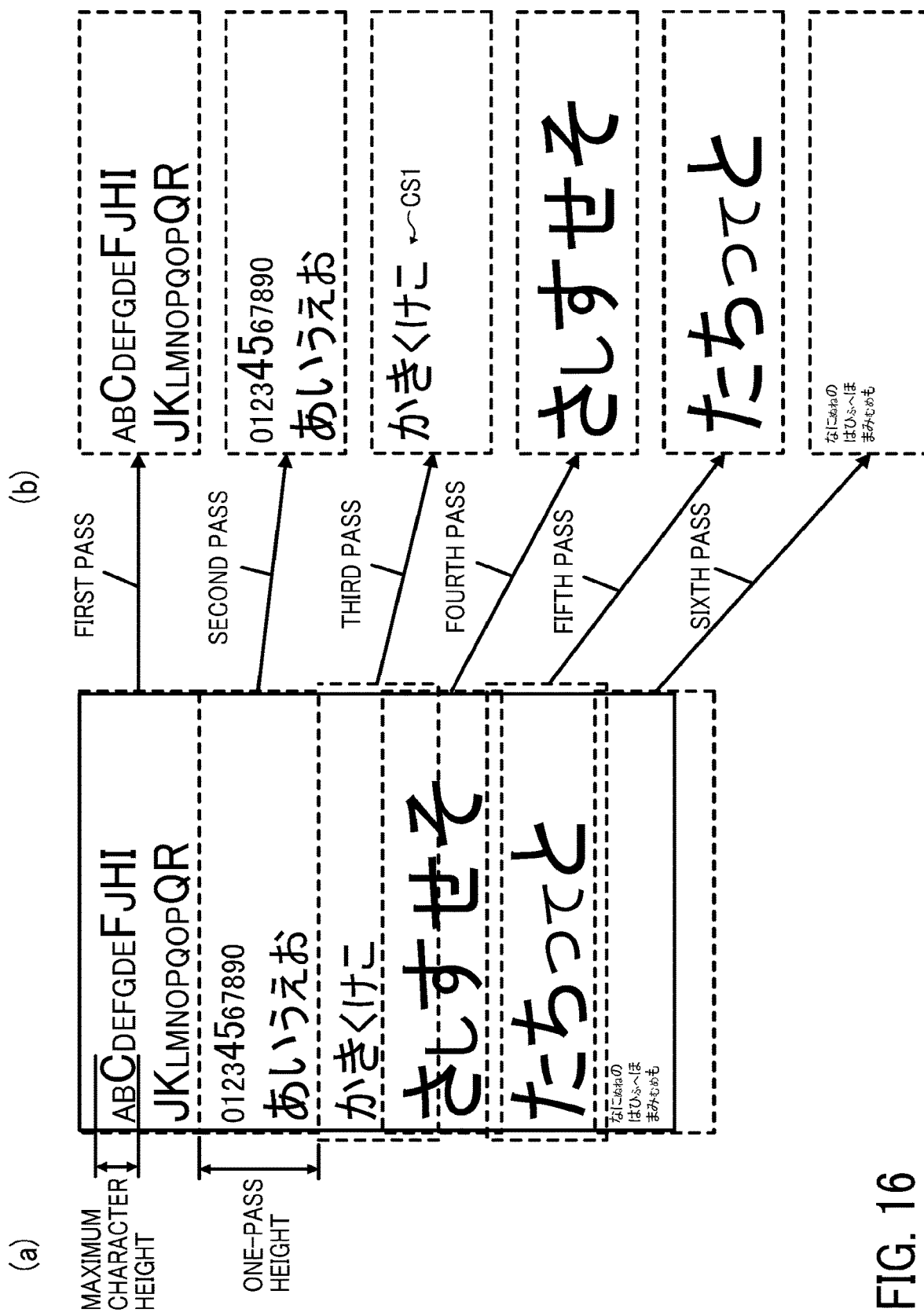
FIG. 16 is a diagram illustrating a way to generate pass data from text data that includes character strings constructed of different sizes of characters.
Figure 17:
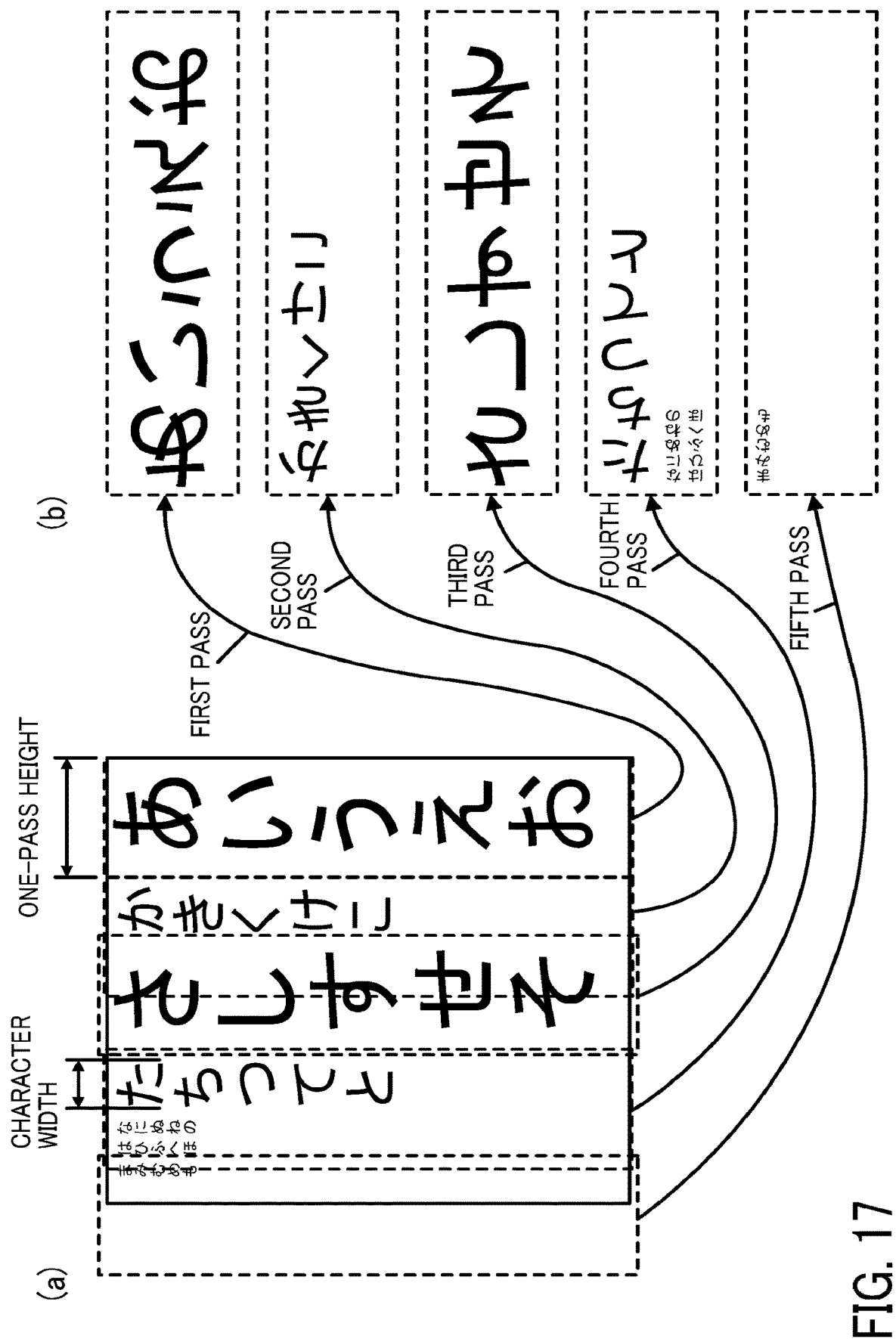
FIG. 17 is a diagram illustrating a way to generate pass data from vertically written text data.

Referring now to FIGS. 15 to 17, a description is given of pass data that is generated by the data generation system described above.

FIGS. 15 and 16 illustrate examples of generating pass data from horizontally written text data. FIG. 17 illustrates an example of generating pass data from vertically written text data.

Note that, in order to clarify how to generate the pass data, FIG. 15 illustrates an example of intermediate data that is generated during the process of generating the pass data. The intermediate data is commonly generated during the process of generating the pass data from the text data, regardless of the character size and writing direction. In other words, the intermediate data as illustrated in FIG. 15 is also generated during the process of generating the pass data from the text data that includes different sizes of characters or from the vertically written text data.

Referring to FIG. 15, Section (a) illustrates the text data. Section (b) in FIG. 15 illustrates the intermediate data. Section (c) in FIG. 15 illustrates the pass data generated.

The text data is a character data unit constructed of, e.g., the character code, the character size, and decoration data such as bold and underline.

The data generation system analyzes the text data in order from top to bottom. The analysis includes, e.g., the rendering and calculation of the pass height described above.

The characters of a character string line may be different in size, as illustrated in Section (a) in FIG. 16.

Section (a) in FIG. 16 illustrates the text data that includes character strings constructed of different sizes of characters. Section (b) in FIG. 16 illustrates the pass data generated.

When a character string line is constructed of different sizes of characters as illustrated in Section (a) in FIG. 16, the greatest character height of the different sizes of characters is determined as the height of the character string line.

Referring back to FIG. 15, the heights of character string lines are added from the first line as illustrated in Section (b) in FIG. 15. For example, the height of the second line is added to the height of the first line. When the Mth line and the Nth line are the first line of addition and a line to be added, respectively, the pass height is a sum of heights of lines from the Mth line to the Nth line. When the pass height exceeds the one-pass height, that is, when the pass height falls outside the range of the one-pass data indicated by a broken line in Section (b) in FIG. 15, the generation unit 92 generates data for one pass (i.e., one-pass data) including lines from the Mth line to the (N-1)th line.

A detailed description is now given with continued reference to FIG. 15.

With regard to the first pass, a sum of heights of the first to third lines of the text data exceeds the one-pass height when the third line is analyzed. That is, "ABCDEFGDEFJHI" on the first line and "JKLM- NOPQOPQR" on the second line are within the range indicated by a broken line; whereas "01234567890" on the third line is outside the range indicated by the broken line. Therefore, the first and second lines are generated as pass data of the first pass. By performing substantially the same process on the other passes, the generation unit 92 generates 6 pieces of pass data as illustrated in Section (c) in FIG. 15. The same applies to the case in which a character string line includes different sizes of characters as illustrated in Section (b) in FIG. 16.

As illustrated in Section (c) in FIG. 15 and Section (b) in FIG. 16, a space is inserted below a character string CS1 of the third pass data corresponding to the third pass, for example. In the handheld printer 10, the vertical interval between the passes is changeable by the user. Therefore, the user visually determines the position to start scanning, thereby acquiring a desired print result substantially the same as the text data without the space.

Referring now to FIG. 17, a description is given of the example of generating pass data from vertically written text data.

Section (a) in FIG. 17 illustrates the text data. Section (b) in FIG. 17 illustrates the pass data generated.

In the present example, the data generation system analyzes the text data in order from right to left of the sheet on which FIG. 17 is illustrated.

The characters of a character string column may be different in size. In this case, the greatest character width of the different sizes of characters constructing the character string column is determined as the width of the character string column. Then, the widths of the character string columns are added from the first column. For example, the width of the second column is added to the width of the first column. Similar to the case of generating pass data from horizontally written text data, the pass height is a sum of the widths. When the pass height exceeds the one-pass height, the generation unit 92 generates data for one pass (i.e., one-pass data) including one or more columns that precede the last column added. Thus, in the example illustrated in FIG. 17, five pieces of pass data are generated.

Figure 18:
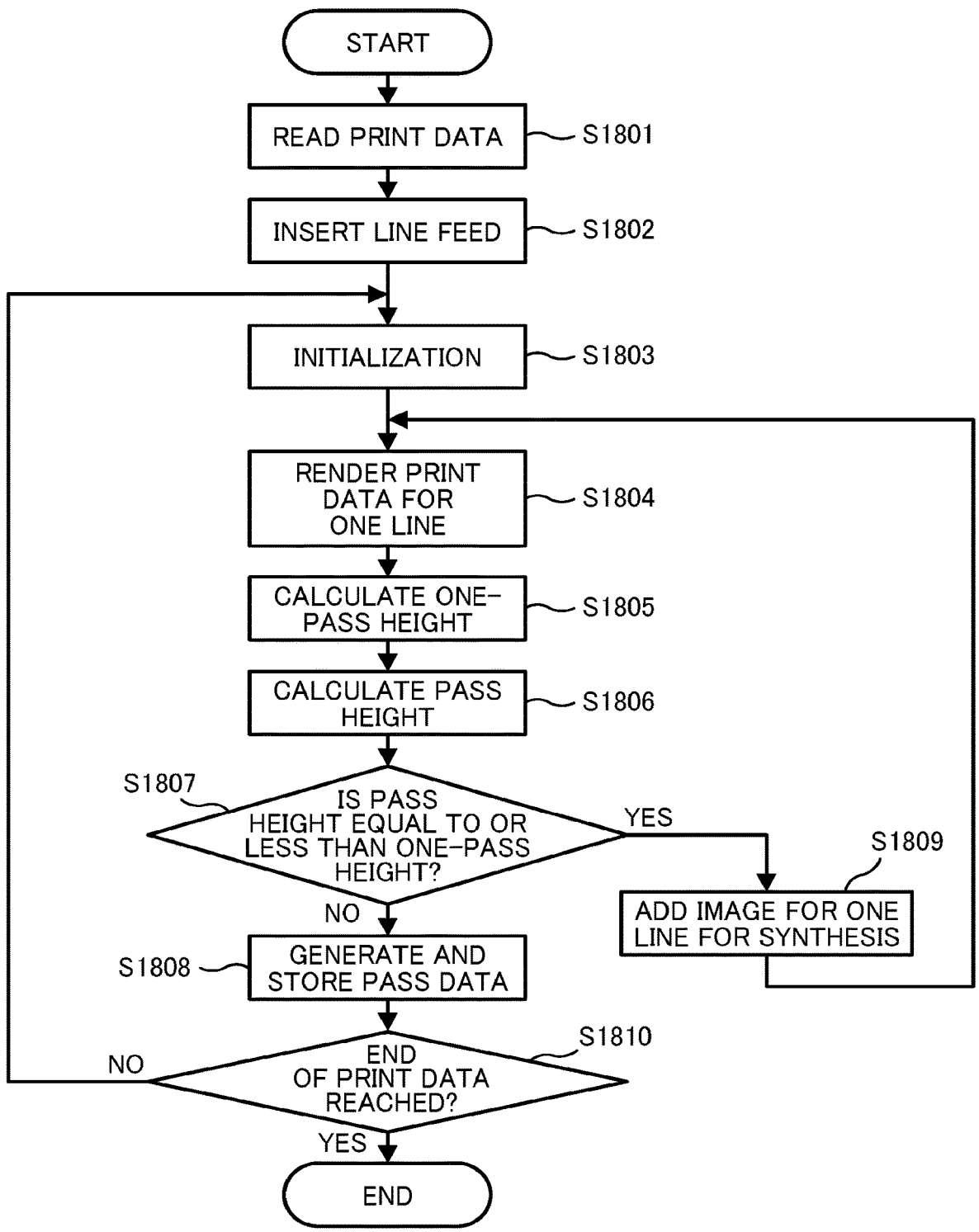
FIG. 18 is a flowchart of a process executed by the data generation system to generate pass data.

Referring now to FIG. 18, a detailed description is given of a flow of a process executed by the data generation system to generate pass data.

FIG. 18 is a flowchart of the process executed by the data generation system to generate pass data.

In step S1801, the data generation system reads print data.

In step S1802, the data generation system calculates the image width from the print data. When the image width is greater than a target width for output with the handheld printer 10, that is, when the image width is greater than the one-pass width, the data generation system inserts a line feed at the one-pass width, thereby adjusting the image width to fit within the one-pass width. The adjustment can be activated or deactivated by, e.g., a user. When the adjustment is deactivated, the process proceeds to step S1803 without the adjustment.

In step S1803, the data generation system secures a memory area for generating data for one pass (i.e., one-pass data). The data generation system initializes the memory area and a control variable to record, as the control variable, the number of times of rendering in one pass. In the initialization of the memory area, the data generation system secures, as empty data, a memory for "the number of dots of the nozzle height X the number of dots of the print width". In the initialization of the control variable, the data generation system clears the number of counts so far to zero.

In step S1804, the data generation system divides the print data constructed of a plurality of character string lines into individual lines while keeping each of characters constructing the character sting lines unseparated in the direction perpendicular to the scanning direction. The data generation system then analyzes the print data for one line. The data generation system renders the print data for one line. In other words, the data generation system converts the print data for one line into an image or image data according to, e.g., the character code, the character size, the font type, and the image information of the one line. The data generation system performs the rendering several times to generate one-pass data. The data generation system counts and stores the number of rending as a control variable N.

In step S1805, the data generation system calculates a one-pass height Hop by Formula 1

$$Hop = Hi - Mu - Ml$$

wherein Hi represent the nozzle height, Mu represents a length of the upper margin in the direction perpendicular to the scanning direction, and Ml represents a length of the lower margin in the direction perpendicular to the scanning direction.

In step S1806, the data generation system calculates a pass height Hp by Formula 2

$$Hp = \sum_{n=1}^{N} Hn$$

wherein N represents a control variable and H represents the character height when the image data (i.e., print data rendered in step S1804) includes horizontally written character strings, the character width when the image data includes vertically written character strings, or any set value.

In step S1807, the data generation system determines whether the pass height Hp is equal to or less than the one-pass height Hop. When the pass height Hp exceeds the one-pass height Hop (NO in step S1807), the process proceeds to step S1808. In step S1808, the data generation system generates and stores one-pass data that includes the most continuous areas fit within the one-pass height Hop, that is, the lines from the Mth line to the (N-1)th line. On the other hand, when the pass height Hp is equal to or less than the one-pass height Hop (YES in step S1807), the process proceeds to step S1809.

In step S1809, the data generation system adds the image for one line for synthesis. When the memory is empty, the data generation system stores the image data (i.e., rendered print data) from the initial address. When the image data of the preceding line is stored in the memory, the data generation system stores the image data of the current line from an address following the end address of the image data of the preceding line. Thus, the data generation system arranges continuous lines of image data. This is an example in which the data generation system synthesizes continuous areas of an image as one-pass data. The way of using the memory depends on hardware. When the synthesizing process is thus complete, the process returns to step S1804 to process the next line.

In step S1808, the data generation system generates and stores one-pass data. Meanwhile, the data generation system discards image data (i.e., rendered print data) of a line excluded from the synthesis. For example, when the data generation system excludes the image data (i.e., rendered image data) of the Nth line from the synthesis because the pass height Hp exceeds the one-pass height Hop in step S1807, the data generation system discards the image data of the Nth line in step S1808.

In step S1810, the data generation system determines whether the end of the print data is reached, that is, whether the last line of the print data is processed. When the end of the print data is reached (YES in step S1810), the data generation system ends the process. On the other hand, when the end of the print data is not reached (NO in step S1810), the data generation system returns to step S1803 to release the memory and clear the control variable counted and stored to the initial value 0. Then, the data generation system generates data for the next pass (i.e., next one-pass data). Note that the generation of the next one-pass data starts from the line discarded in step S1808. In the example described above, the image data of the Nth line is discarded in step S1808. Therefore, the data generation system generates one-pass data starting from the image data of the Nth line.

As described above, when image elements (e.g., characters) constructing an image are partially outside a pass, the data generation system includes the image elements in a subsequent pass. Thus, the data generation system generates pass data. Accordingly, an image is formed such that, e.g., a user recognizes the image elements. In addition, such generation of pass data enhances the quality of the image elements printed.

A computer-readable storage or recording medium storing program code according to the embodiments of the present disclosure is providable. Alternatively, e.g., a server device may be providable that stores the program code and provides the program code upon a download request. In addition, a data generation method and an image forming system according to the embodiments of the present disclosure are providable.

According to the embodiments of the present disclosure, an image is formed so that the image elements are easily recognized.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read-only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. A data generation system, comprising:
   circuitry configured to
      generate data of sub-images constructing an image, each of the sub-images including at least one of a plurality of image elements of the image, the image elements being aligned in a first direction perpendicular to a second direction in which an image forming apparatus moves to form the image, and
      when, in an attempt to add, into one of the sub-images, another one of the image elements adjacent, in the first direction, to the at least one of the image elements, and said another one of the image elements does not fit, in the first direction, within the one of the sub-images because a total height would exceed a predetermined height, generate data of the one of the sub-images without said another one of the image elements.

2. The data generation system according to claim 1, herein the circuitry s further configured to incorporate said another one of the image elements in another one of the sub-images adjacent, in the first direction, to the one of the sub-images and generate data of said another one of the sub-images.

3. The data generation system according to claim 1, wherein the circuitry is further configured to:
   divide the image into areas while keeping each of the image elements unseparated in the first direction;
   arrange the areas into segments based on a length of each of the areas in the first direction and a length, in the first direction, of an image forming range by one movement of the image forming apparatus in the second direction, each of the segments including most continuous areas that fit within the image forming range; and
   generate the data of the sub-images with image information of the segments.

4. The data generation system according to claim 3,
   wherein the image includes character string lines,
   wherein the circuitry is further configured to divide the image into the character string lines, and arrange the character string lines into the segments,
   wherein each of the segments includes at least one of the character string lines fitting within the image forming range, and
   wherein the circuitry is further configured to generate data of an image of the at least one of the character string lines with information of the at least one of the character string lines.

5. The data generation system according to claim 3,
   wherein the image includes character string columns,
   wherein the circuitry is further configured to divide the image into the character string columns, and arrange the character string columns into the segments, wherein each of the segments includes at least one of the character string columns fitting within the image forming range, and wherein the circuitry is further configured to generate data of an image of the at least one of the character string columns with information of the at least one of the character string columns.

6. The data generation system according to claim 3, wherein the circuitry is further configured to:

calculate a first length that is a length of a first area of the areas in the first direction, determine whether the first length calculated is equal to or less than the length of the image forming range in the first direction;

synthesize the first area and a second area continuous with the first area, in response to determination that the first length calculated is equal to or less than the length of the image forming range in the first direction;

calculate a second length that is a length of a synthesis area including the first area and the second area in the first direction; and determine whether the second length calculated is equal to or less than the length of the image forming range in the first direction.

7. The data generation system according to claim 3, wherein the circuitry is further configured to, in response to a length of the image in the second direction being greater than a length of the image forming range in the second direction, adjust the length of the image in the second direction to be equal to or less than the length of the image forming range in the second direction.

8. The data generation system according to claim 3, wherein the image forming range used by the circuitry to arrange the areas into segments is defined by a length of a droplet discharger of the image forming apparatus in the first direction.

9. The data generation system according to claim 3, wherein the image forming range used by the circuitry to arrange the areas into segments is defined by a length of a droplet discharger of the image forming apparatus in the first direction and a length of a blank area in the first direction, and wherein the blank area does not form the image.

10. A communication terminal comprising the data generation system according to claim 1 to output data that an image forming apparatus uses to form an image.

11. An image forming apparatus comprising the data generation system according to claim 1 to acquire an image output from a communication terminal and form an image.

12. The data generation system of claim 1, wherein the circuitry is further configured to determine the total height by adding a height of the another one of the image elements and a height of the at least one of the image elements, and determine whether the determined total height exceeds the predetermined height.

13. A data generation method comprising:

dividing an image into areas while keeping each of image elements of the image unseparated in a direction perpendicular to a given direction in which an image forming apparatus moves to form the image;

arranging the areas into segments based on a length of each of the areas in the direction perpendicular to the given direction and a length, in the direction perpendicular to the given direction, of an image forming range by one movement of the image forming apparatus in the given direction, each of the segments including most continuous areas that fit within the image forming range; and generating, with image information of the segments, data of sub-images constructing the image.

14. A non-transitory, computer-readable storage medium storing computer-readable program code that causes a computer to perform a data generation method, the data generation method comprising:

dividing an image into areas while keeping each of image elements of the image unseparated in a direction perpendicular to a given direction in which an image forming apparatus moves to form the image;

arranging the areas into segments based on a length of each of the areas in the direction perpendicular to the given direction and a length, in the direction perpendicular to the given direction, of an image forming range by one movement of the image forming apparatus in the given direction, each of the segments including most continuous areas that fit within the image forming range; and generating, with image information of the segments, data of sub-images constructing the image.

* * * * *